(12) United States Patent
Colombo et al.

(10) Patent No.: US 11,057,194 B2
(45) Date of Patent: Jul. 6, 2021

(54) PROCESSING SYSTEM, RELATED INTEGRATED CIRCUIT, DEVICE AND METHOD

(71) Applicants: STMicroelectronics Application GMBH, Ascheim-Dornach (DE); STMicroelectronics S.r.l., Agrate Brianza (IT)

(72) Inventors: Roberto Colombo, Munich (DE); Guido Marco Bertoni, Bernareggio (IT); William Orlando, Peynier (FR); Roberta Vittimani, Agrate Brianza (IT)

(73) Assignees: STMICROELECTRONICS S.R.L., Agrate Brianza (IT); STMICROELECTRONICS APPLICATION GMBH, Ascheim-Dornach (DE)

( * ) Notice: Subject to any disclaimer, the term of this patent is extended or adjusted under 35 U.S.C. 154(b) by 252 days.

(21) Appl. No.: 16/022,033

(22) Filed: Jun. 28, 2018

(65) Prior Publication Data

US 2019/0007201 A1 Jan. 3, 2019

(30) Foreign Application Priority Data

Jul. 3, 2017 (IT) .......................... 102017000074269
Jul. 3, 2017 (IT) .......................... 102017000074295

(51) Int. Cl.
*H04L 9/08* (2006.01)
*G06F 13/36* (2006.01)
(Continued)

(52) U.S. Cl.
CPC ............ *H04L 9/0819* (2013.01); *G06F 13/36* (2013.01); *H04L 9/0897* (2013.01); *H04L 9/14* (2013.01);
(Continued)

(58) Field of Classification Search
CPC ........ H04L 9/0819; H04L 9/0897; H04L 9/14; H04L 9/3239; G06F 13/36
See application file for complete search history.

(56) References Cited

U.S. PATENT DOCUMENTS 6,101,255 A * 8/2000 Harrison ................. G06F 21/72
380/277
7,444,506 B1 * 10/2008 Datta ................... H04L 63/0428
370/238

(Continued)

OTHER PUBLICATIONS

Evans, Donald L., et al., "Fips Pub 140-2 Change Notices (Dec. 3, 2002) Security Requirements for Cryptographic Modules Category: Computer Security Subcategory: Cryptography," Mar. 12, 2002, XP055142285, Retrieved from the Internet: URL:http://csrc.nist.govjpublications/fips/fips140-2/fips1402.pdf*, Overview at pp. 1-2, Section 4.2 at pp. 14-15.

(Continued)

*Primary Examiner* — Vance M Little
(74) *Attorney, Agent, or Firm* — Slater Matsil, LLP

(57) ABSTRACT

A processing system includes a first processing unit; a second processing unit; and a cryptographic coprocessor communicatively coupled to the first processing unit and the second processing unit. The cryptographic coprocessor includes a key storage memory for storing a cryptographic key; a first interface configured to receive source data to be processed directly from the first processing unit; a hardware cryptographic engine configured to process the source data as a function of the cryptographic key stored in the key storage memory; a second interface configured to receive a first cryptographic key directly from the second processing unit; and a hardware key management circuit configured to store the first cryptographic key in the key storage memory.

22 Claims, 10 Drawing Sheets

(51) Int. Cl.
*H04L 9/14* (2006.01)
*H04L 9/32* (2006.01)

(52) U.S. Cl.
CPC ........ *H04L 9/3239* (2013.01); *H04L 2209/38* (2013.01)

(56) References Cited

U.S. PATENT DOCUMENTS

| | | | |
|---|---|---|---|
| 9,871,772 B1* | 1/2018 | Weinstein | H04L 63/0435 |
| 10,242,197 B2* | 3/2019 | Zander | G06F 21/577 |
| 2002/0012430 A1* | 1/2002 | Lim | H04L 9/0625 |
| | | | 380/29 |
| 2009/0282265 A1* | 11/2009 | Aissi | G06F 21/6218 |
| | | | 713/193 |
| 2010/0254537 A1 | 10/2010 | Buer et al. | |
| 2010/0322423 A1* | 12/2010 | Boehler | H04L 9/3263 |
| | | | 380/255 |
| 2011/0191599 A1 | 8/2011 | Chou et al. | |
| 2012/0033806 A1* | 2/2012 | Bertoni | H04L 9/0662 |
| | | | 380/42 |
| 2012/0221854 A1* | 8/2012 | Orsini | H04L 9/3226 |
| | | | 713/167 |
| 2013/0219189 A1 | 8/2013 | Simmons | |
| 2014/0289443 A1* | 9/2014 | Iizuka | G06F 21/72 |
| | | | 710/310 |
| 2015/0178239 A1* | 6/2015 | Guthrie | G06F 15/00 |
| | | | 710/104 |
| 2015/0256537 A1* | 9/2015 | Chew | G06F 21/30 |
| | | | 726/7 |
| 2015/0371055 A1* | 12/2015 | Park | G06F 21/6218 |
| | | | 713/165 |
| 2016/0070932 A1 | 3/2016 | Zimmer et al. | |
| 2016/0364343 A1 | 12/2016 | Case et al. | |
| 2019/0007202 A1 | 1/2019 | Colombo et al. | |

OTHER PUBLICATIONS

"The AES-CMAC Algorithm", https://en.wikipedia.org/wiki/Block_cipher_mode_of_operation and RFC 4493, Jun. 2006, 12 pages.

* cited by examiner

PROCESSING SYSTEM, RELATED INTEGRATED CIRCUIT, DEVICE AND METHOD

CO-PENDING APPLICATIONS

This application is related to co-pending patent application Ser. No. 16/022,110, filed on Jun. 28, 2018, which are commonly owned by STMicroelectronics S.r.l. and STMicroelectronics Application GmbH.

CROSS-REFERENCE TO RELATED APPLICATIONS

This application claims priority to Italian Patent Application No. 102017000074269, filed on Jul. 3, 2017 and Italian Patent Application No. 102017000074295, filed Jul. 3, 2017, which applications are hereby incorporated herein by reference.

TECHNICAL FIELD

Embodiments of the present disclosure relate to secure processing systems.

BACKGROUND

FIG. 1 shows a typical electronic system, such as the electronic system of a vehicle, comprising a plurality of processing systems 10, such as embedded systems or integrated circuits, e.g., a Field Programmable Gate Array (FPGA), Digital Signal Processor (DSP) or a micro-controller (e.g., dedicated to the automotive market).

For example, in FIG. 1 are shown three processing systems 101, 102 and 103 connected through a suitable communication system 20. For example, the communication system may include a vehicle control bus, such as a Controller Area Network (CAN) bus, and possibly a multimedia bus, such as a Media Oriented Systems Transport (MOST) bus, connected to the vehicle control bus via a gateway. Typically, the processing systems 10 are located at different positions of the vehicle and may include, e.g., an Engine Control Unit (ECU), a Transmission Control Unit (TCU), an Anti-lock Braking System (ABS), a body control modules (BCM), and/or a navigation and/or multimedia audio system.

Security in automotive applications is becoming a key element, especially after it has been demonstrated that hackers may remotely control given functions of a vehicle. For this reason, communications between the various processing systems 10 of the vehicle (at least those having a possible impact on security) should be encrypted, raising additional problems in terms of message processing, e.g., in terms of latency and robustness.

These emerging and steadily increasing requests to have security features within the processing systems 10 has led to the introduction of a secure "brain" within each processing system 10. Usually, this secure element is a dedicated and preferably programmable hardware component (e.g., within an FPGA, DSP or micro-controller) and dedicated to handle and/or supervise security functions.

For example, FIG. 2 shows a block diagram of a typical processing system 10 with additional security functions, such as a micro-controller.

Typically, the processing system 10 includes at least one processing unit 102, such as a microprocessor, usually the Central Processing Unit (CPU), programmed via software instructions.

As mentioned before, the processing system 10 includes also a secure element, often referred to as Hardware Security Module (HSM). Specifically, the secure element HSM may include a processing unit 106, such as an additional microprocessor programmed via software or a dedicated hardware module, and may include a cryptographic coprocessor containing one or more digital encryption/cipher keys (being unknown to the non-secure element, i.e., the processing unit 102) and which may be used, e.g., to encrypt or decrypt data packets. For example, in this way the software developer of a micro-controller can use given security functions, while the encryption key is pre-programmed in the secure element HSM and kept secret. Moreover, the firmware of the microprocessor 102 may be update, without having to include the encryption key(s) in the firmware file.

For example, the secure element HSM may be configured to use the encryption key together with a symmetric (e.g., Advanced Encryption Standard, AES) or asymmetric encryption algorithm, e.g., in order to encrypt or decrypt data, verify the identity of a sender, e.g., by decrypting a signature field or calculating a hashing function, etc.

Usually, the secure element HSM is in an isolated environment, e.g., in order to block access to the firmware (and thus the encryption keys) of the processing unit 106.

Generally, the processing system 10 may also include one or more resources 104, such as: one or more memories, such as a volatile memory and/or a non-volatile memory, e.g. a flash memory; and/or one or more communication interfaces, such as Universal asynchronous receiver/transmitter (UART), Serial Peripheral Interface Bus (SPI), Inter-Integrated Circuit (I2C), Controller Area Network (CAN) bus, Ethernet; and/or one or more analog-to-digital and/or digital-to-analog converters; and/or one or more dedicated digital components, such as hardware timers and/or counters; and/or one or more analog components, such as comparators, sensors, such as a temperature sensor, etc.; and/or one or more mixed signal components, such as a Pulse-Width Modulation (PWM) driver.

Generally, each of these resources 104 may be: a local resource 104a accessible by (e.g. only by) the non-secure processing unit 102; a shared resource 104b accessible by both processing units 102 and 106; or a local resource 104c accessible by (e.g. only by) the secure processing unit 106.

Accordingly, the processing systems 10 includes a secure element HSM and one or more non-secure elements, e.g., the processing unit 102, wherein the secure element HSM is typically isolated from the non-secure elements. Accordingly, the processing system 10 includes also a communication channel between the secure processing unit 106 and the non-secure processing unit 102 in order to run, upon request, security services provided by the secure element HSM.

Such processing systems 10 with dedicated Hardware Security Module are known, e.g. from various TriCore™ AURIX™ microcontrollers (e.g., TC39x or TC3xx from Infineon) or Power Architecture™ microcontrollers (e.g., MPC56xx, MPC57xx from NXP or SPC56x, SPC57x, SPC58x from the present applicant).

SUMMARY

Various embodiments of the present disclosure relate to a processing system. In various embodiments, the processing system includes a first processing unit, a second processing unit and a cryptographic coprocessor.

In various embodiments, the cryptographic coprocessor includes a key storage memory adapted to storing at least one cryptographic key. In various embodiments, the cryptographic coprocessor includes moreover a first interface configured to receive source data to be processed directly from the first processing unit, and a hardware crypto engine configured to process the source data as a function of at least one cryptographic key stored in the key storage memory.

For example, in various embodiments, the hardware crypto engine may be configured to selectively encrypt or decrypt the source data. In this case, the first processing unit may send source data to the first interface requesting the encryption of the source data. Next, the first processing unit may read the encrypted source data (DD) from the first interface and transmit the encrypted source data via a communication interface, e.g., to a further processing system. In a complementary way, the first processing unit may receive encrypted source data via a communication interface, e.g., from a further processing system. Next, the first processing unit may send the encrypted source data to the first interface requesting the decryption of the encrypted source data and read the decrypted source data from the first interface.

In various embodiments, the cryptographic coprocessor includes a second interface configured to receive a first cryptographic key directly from the second processing unit and a hardware key management circuit configured to store the first cryptographic key in the key storage memory. For example, the second processing unit may be configured to read the first cryptographic key from the non-volatile memory and send the first cryptographic key to the second interface.

In various embodiments, the second processing unit may be a microprocessor programmed via software instructions. In this case, the second interface may be a special function register of the microprocessor. Similarly, also the first processing unit may be a further microprocessor of the processing system programmed via software instructions, and the first interface may be a special function register of this microprocessor.

Accordingly, in various embodiments, the cryptographic coprocessor is split into two parts: one residing in the HSM domain, which is dedicated to the storage of key in the key storage memory, and the other residing in the host domain which contains the hardware crypto engine (and the first interface) to process the data. Accordingly, in various embodiments, the first processing unit and the hardware crypto engine may be driven with a first clock signal, and the second processing unit and the hardware key management circuit may be driven with a second clock signal, wherein the frequency of the second clock signal may be smaller than the frequency of the first clock signal.

In various embodiments, the processing system may include also a hardware configuration module configured to read a second cryptographic key directly from the non-volatile memory and send the second cryptographic key to the hardware key management circuit, i.e. without passing through the second processing unit. In this case, the hardware key management circuit may be configured to decrypt the first cryptographic key with the second cryptographic key, e.g. by using the hardware crypto engine.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
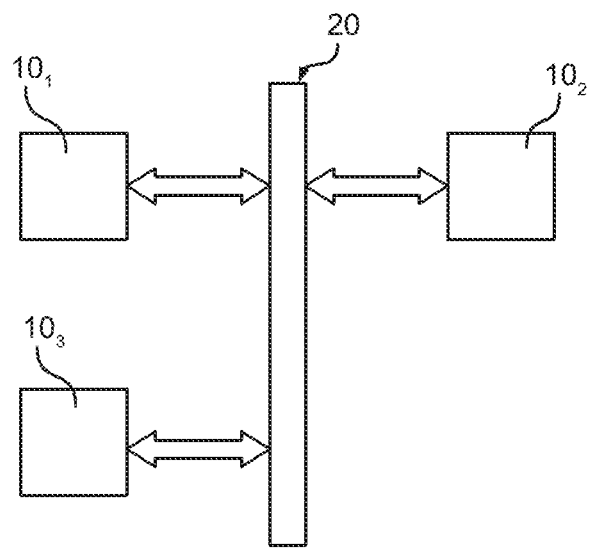
FIGS. 1 and 2 show typical processing systems including a hardware secure module.
Figure 2:
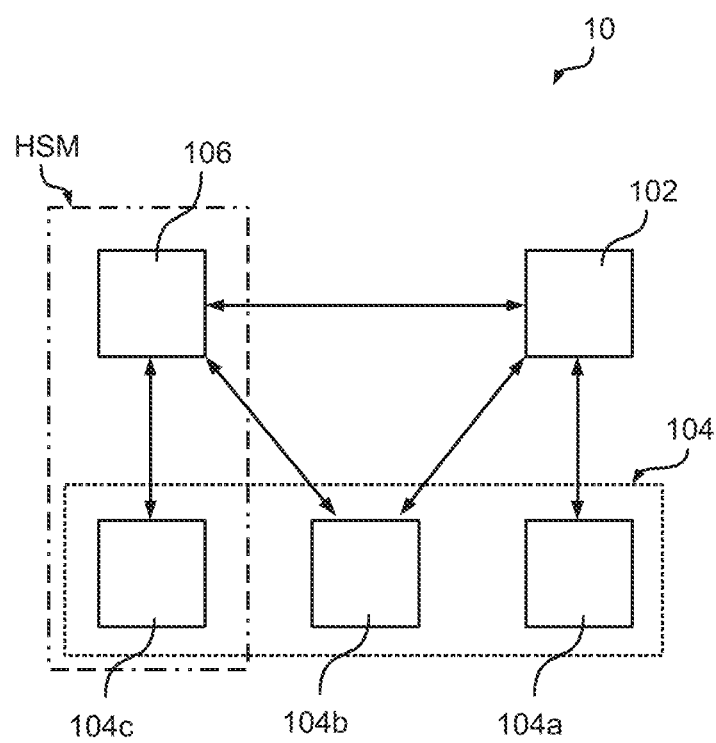

In the following FIG. 3 to 16 parts, elements or components which have already been described with reference to FIGS. 1 and 2 are denoted by the same references previously used in such Figures; the description of such previously described elements will not be repeated in the following in order not to overburden the present detailed description.

It is an objective of various embodiments of the present disclosure to provide solutions able to improve the operations of a hardware secure module. According to one or more embodiments, one or more of the above objectives is achieved by a processing system having the features described below. Embodiments moreover concern a related integrated circuit, device and method.

Hardware Secure Module with Cryptographic Coprocessor

Figure 3:
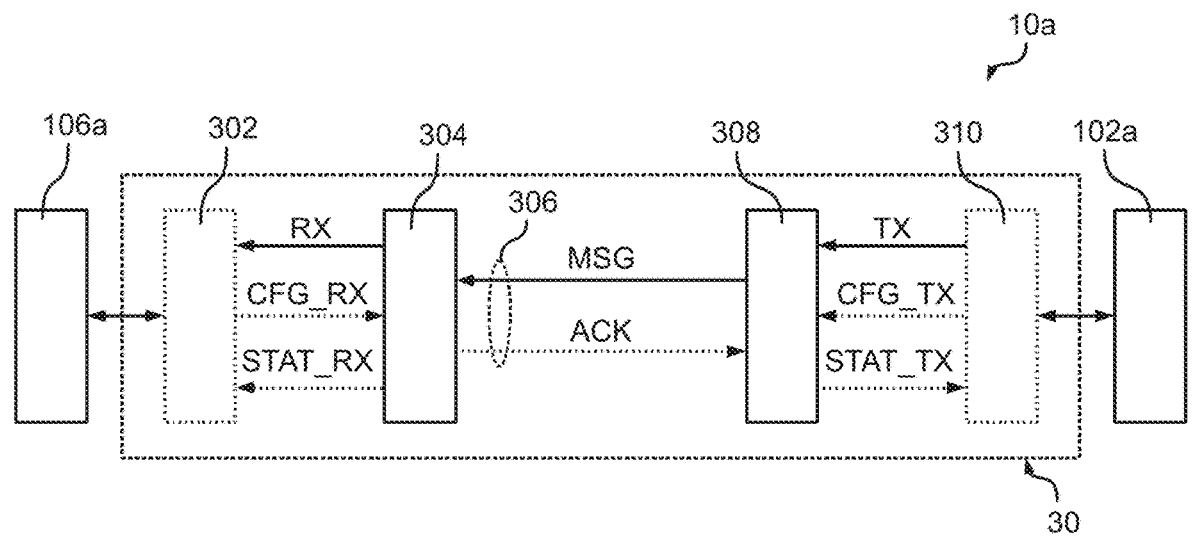
FIG. 3 shows an embodiment of a processing system in accordance with the present disclosure.

FIG. 3 shows a first embodiment of a processing system 10a, wherein a non-secure element and a secure element may exchange data. As mentioned in the foregoing, the processing system 10a may be an embedded system or preferably an integrated circuit, such as a micro-controller, including one or more non-secure elements and a secure element.

In various embodiments, the non-secure element(s) include a processing unit 102a, such as a micro-processor (usually the CPU) programmed via software instructions. Similarly, the secure element includes a processing unit 106a, such as a second micro-processor and/or a custom hardware module, wherein the second processing unit 106a is configured to execute security functions being based on at least one cryptographic key, such as encryption and/or decryption operation.

In the embodiment considered a transmission system 30 is used to transmit data from the non-secure processing unit 102a to the secure processing unit 106a. Generally, the communication between the non-secure processing unit 102a and the secure processing unit 106a is usually bi-directional. While in the following will be discussed mainly the transmission from the non-secure processing unit 102a to the secure processing unit 106a, a similar communication may also be used for the transmission from the secure processing unit 106a to the non-secure processing unit 102a.

Specifically, in the embodiment considered, the non-secure processing unit 102a has associated a transmitter circuit 308 and the secure processing unit 106a has associated a receiver circuit 304.

In various embodiments, the non-secure processing unit 102a may provide data to be transmitted TX and/or optional configuration information CFG_TX to the transmitter circuit 308 by storing these data in a register 310. For example, in case the processing system 10a is a microcontroller, the register 310 may be part of the so called Special Function Registers (SFR) of the processing unit 102a, i.e., the register 310 may be addressable via one or more specific addresses in the memory space of the non-secure processing unit 102a. Generally, one or more information STAT_TX in the register 310 may also be written by the transmitter circuit 308, e.g., in order to provide a feedback to the non-secure processing unit 102a concerning the status of the transmission of the data.

Similarly, the receiver circuit 304 may have associated a memory/register 302, in which the receiver circuit 304 may store data RX having been received. Accordingly, the secure processing unit 106a may obtain the data transmitted/received by reading the content of the memory/register 302. Generally, one or more information in the memory/register 302 may also be written by the secure processing unit 106a, e.g., in order to set one or more configuration information CFG_RX to be used by the receiver circuit 304. Generally, the receiver circuit 304 may store also one or more additional information STAT_TX in the memory/register 302, e.g., data concerning the status of the transmission/reception of data. For example, the additional information STAT_TX may be used to determine a transmission error.

Generally, the transmitter circuit 308 and the receiver circuit 304 may exchange data via any suitable communication channel 306, e.g. including one or more electric wires. Moreover, the communication may be based on any synchronous or asynchronous communication protocol. For example, in various embodiments an asynchronous communication protocol is used, such as the Secure Hardware Extension (SHE) protocol.

For example, in various embodiments, the transmitter circuit 308 is configured to transmit a data packet MSG to the receiver circuit 304. For example, in various embodiments, the data packet MSG includes frames of 32 bits, which are transmitted through a 32-bit bus, such that one frame at a time can be transmitted. Generally, the register 310 may also be a First-In First-Out (FIFO) system, thereby permitting that a plurality of consecutive frames can be transmitted in sequence. Preferably, the receiver circuit 304 sends an acknowledge ACK (or negative-acknowledgement) to the transmitter circuit 308, e.g., in order to inform the transmitter circuit 308 that the transmission channel 306 is available.

For example, in various embodiments, the data packet MSG may include the following fields: a command field CMD; an optional context field, e.g. in order to identify a given encryption context; and one or more optional parameters P.

Possible embodiments of the transmission system 30 are described, e.g. in the Italian patent applications IT 102017000050086 and IT 102017000050153, which are incorporated herein by reference. U.S. Patent Appl. Pub. No. 2018/0330123 claims priority to IT 102017000050086 and U.S. Patent Appl. Pub. No. 2018/0330123 claims priority to IT 102017000050153.

Accordingly, in various embodiments, the processing unit 106a of the secure element HSM may process a cryptographic service requests by: receiving a command from the non-secure element 102a; decoding the command and the associated parameters, preferably checking the validity of the data transmitted; executing the command, e.g., with the aid of a cryptographic co-processor, such as an AES hardware coprocessor; and sending an answer to the non-secure element requesting the service.

Accordingly, the communication channel 306 may be used to send cryptographic service requests to the secure element 106a, such as encryption or decryption requests of data having been exchanged between different control units of a vehicle. For example, an engine control unit detecting a dangerous situation might send a message to another control unit asking it to activate the braking system: to avoid attacks on this communication, the data exchanged are preferably encrypted, i.e., one or more of the messages exchanged between different processing systems 10 may be encrypted, and before the message is used by the processing unit 102a, e.g., to control an actuator (e.g., a message for braking), the non-secure processing unit 102a may send a decryption request to the secure processing unit 106a of the same processing system 10a.

This architecture creates a complete separation between the secure and non-secure element: the cryptographic service processing and the keys used for the cryptographic algorithm resides entirely within the secure domain. For example, in various embodiments, the processing unit 106a may read one or more cryptographic keys from a non-volatile memory of the secure hardware module HSMa, such as the memory containing the firmware of the processing unit 106a.

Figure 4:
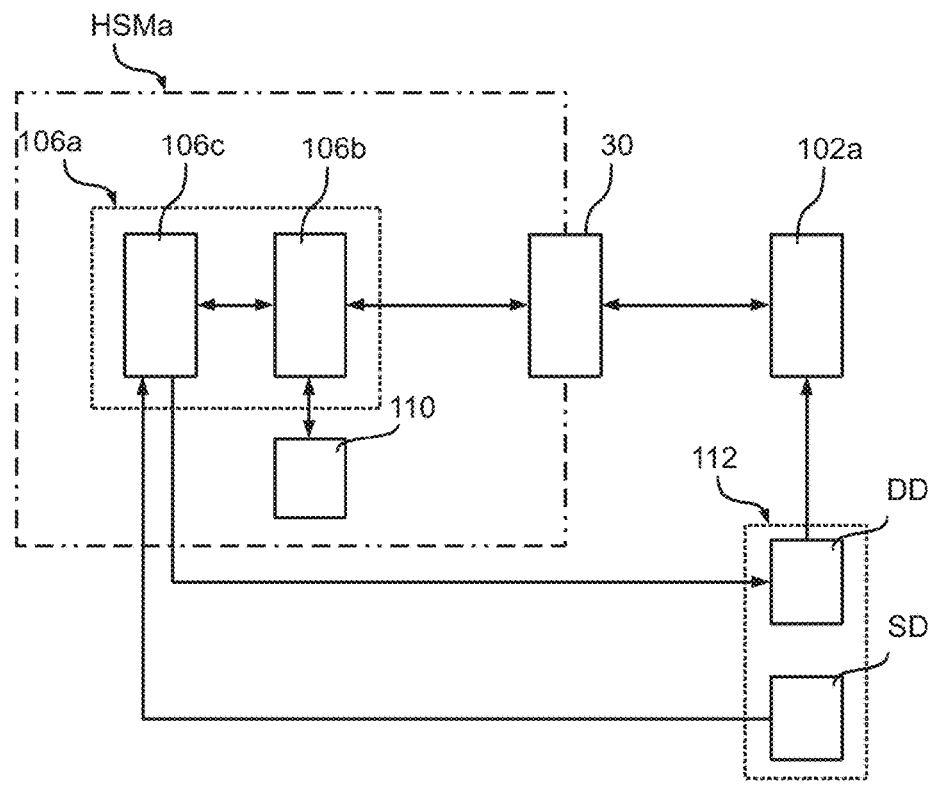
FIG. 4 shows a first embodiment of a hardware secure module including a hardware coprocessor.

For example, FIG. 4 shows an embodiment of an encryption or decryption operation.

In the embodiment considered in FIG. 4, the processing system 10a includes a memory 112 including source data SD to be processed (e.g., to be decrypted or encrypted). Specifically, in the embodiment considered, the memory 112 is a shared memory being accessible by the non-secure processing unit 102a and the secure processing unit 106a, representing thus a shared resource 104b (see also FIG. 2). For example, the memory 112 may be a Random Access Memory (RAM), preferably a dual-port RAM, or a non-volatile memory, such as a flash memory, e.g. the memory containing the firmware of the processing unit 102a.

According, in the embodiment considered, the processing unit 102a may send a data packet MSG to the secure element HSMa, in particular the processing unit 106a, wherein the data packet MSG includes a command CMD indicating a service requested, such as a decryption, encryption, or signature generation or verification request. Generally, the source data SD to be processed may be referenced by a pointer to the memory area containing the source data SD or passed directly in the message MSG. The former case is preferred when the quantity of bytes to be processed is high (e.g., some hundreds of bytes or more), whereas the latter method is preferred when few bytes have to be processed.

Accordingly, in various embodiments, one or more parameters P of the data packet MSG may indicate the memory location of the source data SD. For example, this may be useful for verifying whether a larger quantity of source data SD has not been altered. For example, this may be useful in order to verify whether the firmware of the processing unit 102a stored in a non-volatile memory 112 has been altered, e.g. by verifying a signature field. In this case, the processing unit 106a may return (e.g. only return) a corresponding response.

In various embodiments, one or more additional parameters P of the data packet MSG may indicate also a memory location for storing the processed or destination data DD. Generally, the destination data DD may also be stored in the memory location of the source data SD.

As mentioned before, in various embodiments, one or more parameters P may directly contain the data to be processed SD. For example, this may be useful in order to decrypt/encrypt a single command, such as to open or close request, e.g., of the trunk of the car.

Accordingly, in the embodiment considered, the processing unit 106a receives the data packet MSG, including the command CMD and possibly the additional parameters P.

In the embodiment considered, the processing unit 106a may thus execute the command CMD, e.g. encrypt or decrypt the source data SD stored in the memory 112 and store the destination data DD in the memory 112.

For example, in various embodiments, the processing unit 106a may be implemented with a microprocessor 106b programmed via software instructions and which has associated a hardware cryptographic coprocessor 106c.

Accordingly, in this case, the microprocessor 106b may configure the cryptographic coprocessor 106c, e.g. set the address of the source data SD and configure the cryptographic key to be used. For example, for this purpose, the microprocessor 106b may read one or more cryptographic keys from a non-volatile memory 110, e.g., the memory containing the firmware of the microprocessor 106b.

Next the cryptographic coprocessor 106c reads the source data SD from the memory 112 and processes the data SD. the processed data DD are then written back to the memory 112. Finally, the coprocessor 106c may signal the completion of the operation to the microprocessor 106b.

Accordingly, the secure processing unit 106a, e.g. the microprocessor 106b, may send via the communication system 30 a response to the non-secure processing unit 102a indicating that the source data SD have been processed, and the processing unit 102a may use the processed data DD (e.g., control some actuators as a function of decrypted data or send encrypted data to another processing system 10).

Generally, the parsing and processing of the data contained in the data packet MSG cost time. Generally, the time required for parsing the data packet MSG may be less relevant when the quantity of source data SD to be processed increases. For example, Ethernet frames can be quite long (e.g. in the range of Kbytes), hence the overhead weight is not significant, because the overhead to parse the message (evaluated e.g. in the range of microseconds) is negligible compared to the time needed to process bytes of data. On the other hand, when the source data SD to be processed are small (e.g., few bytes, like in the case of CAN and CAN-FD communication protocols, sending atomic messages that require a very tight processing latency, like in the case of a message requesting a braking operation), the overhead requested to parse the request may become comparable to the time needed to process the data. For example, if the whole processing has to be completed in few microseconds (uSec), losing some uSec only for transmitting and parsing the incoming command frame might not guarantee the intended service response latency.

Thus, in many application, such as automotive applications or other real-time applications, the latency introduced by the decryption operation described in the foregoing (including the transmission to the secure processing unit 106a, the decryption of the data and the reception of the response from the secure processing unit 106a) may be too long in order to ensure a responsive behavior of the complete system.

Figure 5:
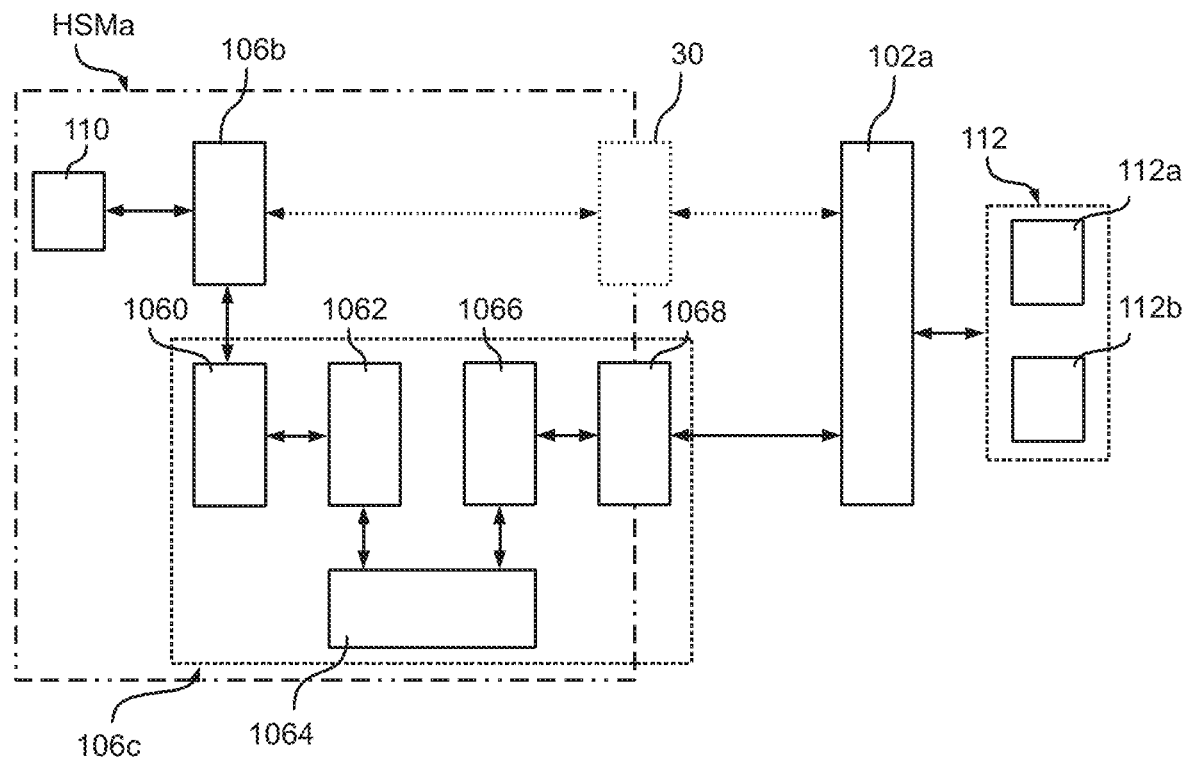
FIGS. 5 and 6 show a second embodiment of a hardware secure module including a hardware coprocessor.

Hardware Secure Module with Cryptographic Coprocessor Having a Register Interface to the Non-Secure Processing Unit FIG. 5 shows a second embodiment of a hardware secure module HSMa. Specifically, also in this case, the processing unit 106a includes a microprocessor 106b and a hardware cryptographic coprocessor 106c.

However, in the embodiment considered, the non-secure processing unit 102a may directly interact with the coprocessor 106c. Generally, as schematically shown in FIG. 5, the processing unit 10a may still include a communications system 30 (see e.g. FIG. 3) for exchanging data between the processing unit 102a and the microprocessor 106b.

For example, in the embodiment considered, the coprocessor 106c has a first communication interface 1060 for exchanging data with the microprocessor 106b and a second communication interface 1068 for exchanging data with the processing unit 102a. For example, these communication interfaces 1060 and/or 1068 may be implemented as registers. For example, similar to the register 310, such registers 1060 and/or 1068 may be part of the so called Special Function Registers (SFR) of the microprocessor 106b and/or the processing unit 106a, respectively, i.e., the registers 1060 and/or 1068 may be addressable via one or more specific addresses in the memory space of the microprocessor 106b and/or the processing unit 102a, respectively.

Accordingly, in various embodiments, the microprocessor 106a and the processing unit 106a may read and write the content of the registers 1060 and 1068 via software instructions.

In various embodiments, the interface 1060 is used to set the security related configuration information of the coprocessor 106c. For example, in various embodiments, the microprocessor 106b may read one or more cryptographic keys from a non-volatile memory 110 of the secure hardware module HSMa, such as the memory containing the firmware of the microprocessor 106b. Next the microprocessor 106b may provide the cryptographic key(s) via the interface 1060 to the coprocessor 106c.

Conversely, the interface 1068 may be used to provide directly data to be processed to the coprocessor 106c. For example, as mentioned before, the processing unit 102a may read the source data SD from a memory 112, such as a RAM 12a or a non-volatile memory 112b, and provide the source data SD via the interface 1068 to the coprocessor 106c.

In various embodiments, the coprocessor 106c may thus include three sub-circuits: a volatile memory 1064, such as a RAM, representing a key storage memory for storing one or more cryptographic keys; a key management circuit 1062 configured to receive via the interface 1060 one or more cryptographic keys (and possibly other configuration data) and to write at least one of the received cryptographic keys to the key storage memory 1064; and a cryptographic hardware module 1066 configured to process, e.g. encrypt or decrypt, the source data SD received via the interface 1068.

Specifically, in various embodiments, the key storage memory 1064 is an internal memory of the coprocessor 106c and thus not accessible by the non-secure processing unit 102a, i.e., the processing unit 102a may not obtain access to the data stored in the key storage memory 1064.

In various embodiments, the key management circuit 1062 may also be configured to set one or more attributes of the cryptographic hardware module 1066, e.g., as a function of configuration data received via the interface 1060.

Accordingly, in the embodiment considered, the memory 110 contains the keys used to run the cryptographic operations. These keys may be programmed, e.g., during the production stage of the processing unit 10a or with a firmware update of the processing unit 106a. These keys are loaded via the microprocessor 106b and the key management circuit 1062 into the memory 1064. In various embodiments, the microprocessor 106b may be configured to perform these operations immediately when the processing unit 10a is switched on, i.e. the keys are already stored in the key storage memory 1064, when the processing unit 102a may request a cryptographic service.

For example, in various embodiments, the cryptographic hardware module 1066 may be configured to implement the Advanced Encryption Standard (AES) symmetric encryption/decryption method. For example, in this case, the key storage memory 1064 may include a plurality of memory locations, for storing a plurality of cryptographic keys. For example, a respective key may be associated with each communication between two respective processing systems 10. In general, the cryptographic hardware module 1066 may however also support other symmetric or also asymmetric encryption methods.

For example, the processing unit iota may provide (via the interface 1068) not only the source data SD to be processed, but also a command specifying the operation to be performed (e.g., encryption or decryption). Plural encryption keys may thus be supported by associating respective cryptographic key with each command code, or by including an additional parameter field, which identifies the cryptographic key to be used, such as the slot number of the memory location in the memory 1064 containing the cryptographic key to be used.

Once the cryptographic hardware module 1066 has processed the source data SD, the cryptographic hardware module 1066 may provide the processed data DD (or possibly only a simple response in case the operation is only used to verify data) via the interface 1068 to the processing unit 102a.

Figure 6:
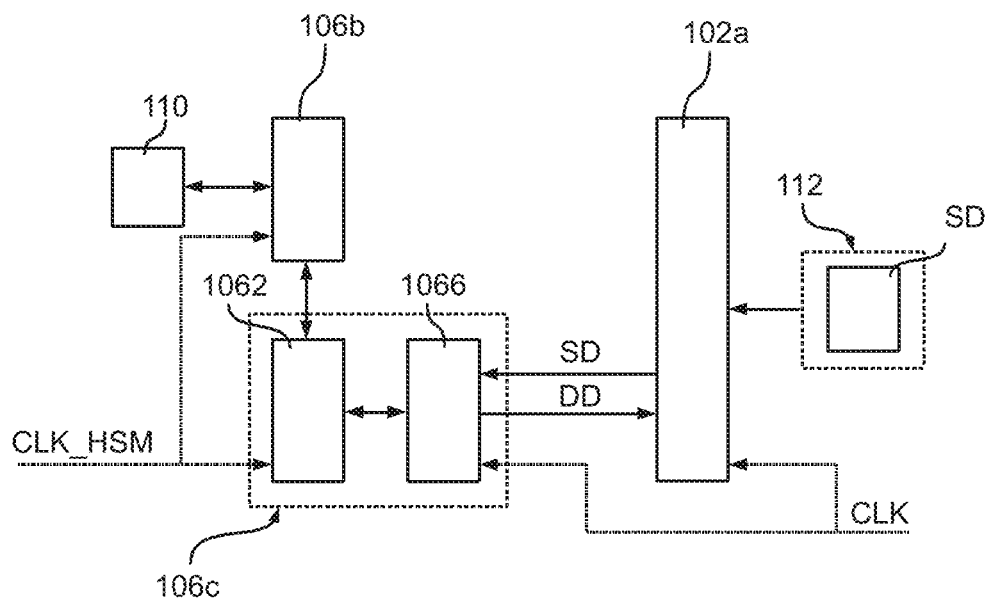

Thus, as shown in FIG. 6, the processing unit 102a may exchange data directly with the cryptographic coprocessor 106c, which has the benefit of reducing the latency needed for the whole cryptographic operation.

Specifically, the processing unit 102a, e.g., a microprocessor programmed via software instructions, may read the source data SD to be processed from some memory 112 and passes the data to the cryptographic coprocessor 106c. The cryptographic coprocessor 106c processes the source data SD and sends the processed data DD back to the processing unit 102a.

As mentioned before, only the cryptographic engine 1066 of the cryptographic coprocessor 106c is accessible (via the interface 1068) by the processing unit 102a. Accordingly, the cryptographic keys used for the cryptographic services are hidden within the secure domain.

In various embodiments, the processing unit 102a and the hardware secure module HSMa may use two different clock signals CLK and CLK_HSM, wherein the frequency of the clock signal CLK_HSM may be, e.g., a fraction of the frequency of the clock signal CLK. In this case, the interface 1060 and the key management circuit 1062 may be driven by the (lower frequency) clock signal CLK_HSM and the cryptographic hardware module 1066 and the interface 1068 may be driven by the (higher frequency) clock signal CLK. In this way, the cryptographic service may be run with the clock signal CLK of the processing unit 102b, i.e., at the speed of the host domain, which typically is much higher than the maximum speed of the clock signal CLK_HSM used by the microprocessor 106b in the HSM domain.

Accordingly, the architecture shown in FIGS. 5 and 6 are particularly useful for processing short data frames. For example, the register 1068 may include 64 bits for storing the source data SD (e.g., by means of a sequence of write operations to the register), which thus permits to store, e.g., the maximum frame length of the CAN-FD protocol.

As mentioned before, in various embodiments, the cryptographic hardware engine 1066 may be configured to implement the AES symmetric encryption/decryption method. As well known to those of skill in the art, a symmetric key encryption method uses the same key to encrypt and decrypt a set of data, i.e. the cryptographic key is known by the processing system 10 encrypting the data and the processing system 10 decrypting the data.

For example, in various embodiments, the cryptographic hardware module 1066 supports one or more of the following operations of the AES standard: Electronic Codebook (ECB) encryption and decryption; and/or Cipher Block Chaining (CBC) encryption and decryption; and/or Cipher-based Message Authentication Code (CMAC) generation and verification.

For example, for a detailed description of the above operations, reference can be made, e.g., to https://en.wikipedia.org/wiki/Block_cipher_mode_of_operation and RFC 4493, "The AES-CMAC Algorithm", June 2006.

As mentioned before, in various embodiments, the key storage memory 1064 may contain a plurality of slots, each adapted to store a respective cryptographic key. Generally, a key slot is a portion of the key storage memory. For example, each slot may include one or more memory locations of a RAM memory, or a register may be used. Generally, the number of memory locations/slots, i.e., the maximum number of cryptographic keys, is decided at the design time. In any case, the number of keys indeed loaded into the key storage memory 1064 may also be smaller than the maximum number. As will be described in greater detail in the following, each slot in the key storage memory 1064 may also include further data, such as configuration data specifying how the respective key should be used.

As mentioned before, the microprocessor 106b may be configured to read the keys from the non-volatile memory 110 and send them to the coprocessor 106c at the startup of the processing system 10a. However, the microprocessor 106b may also write (i.e., add or change) one or more of the keys during the run time by sending one or more new keys to the interface 1060. For example, in line with the embodiment described with respect to FIGS. 3 and 4, the processing unit 102a and the processing unit 106a, in particular the microprocessor 106b, may also exchange data via an additional communication system 30. In this case, the microprocessor 106b may receive a command requesting the exchange of the cryptographic keys with a different set of cryptographic keys stored in the memory 110. Thus, in various embodiments, the memory 110 may include a number of cryptographic keys being greater than the number of key slots in the key storage memory 1064, and the microprocessor 106b may decide the subset of cryptographic keys to be loaded into the key storage memory 1064. Accordingly, in the embodiment considered, the key management via the microprocessor 106b and the key management circuit 1064 is separated and protected from the cryptographic engine 1066 executing the cryptographic service.

Accordingly, in the embodiment considered, while the processing unit 102a may not access the key(s) stored in the key storage memory 1064, the processing unit 102a may still provide information (e.g., via the command code or an additional parameter, or even via the additional communication system 30) used to reference a specific slot number/cryptographic key. Accordingly, before or even when requesting the execution of a cryptographic service, the processing unit 102a may choose the slot number/cryptographic key to be used for the processing.

Figure 7:
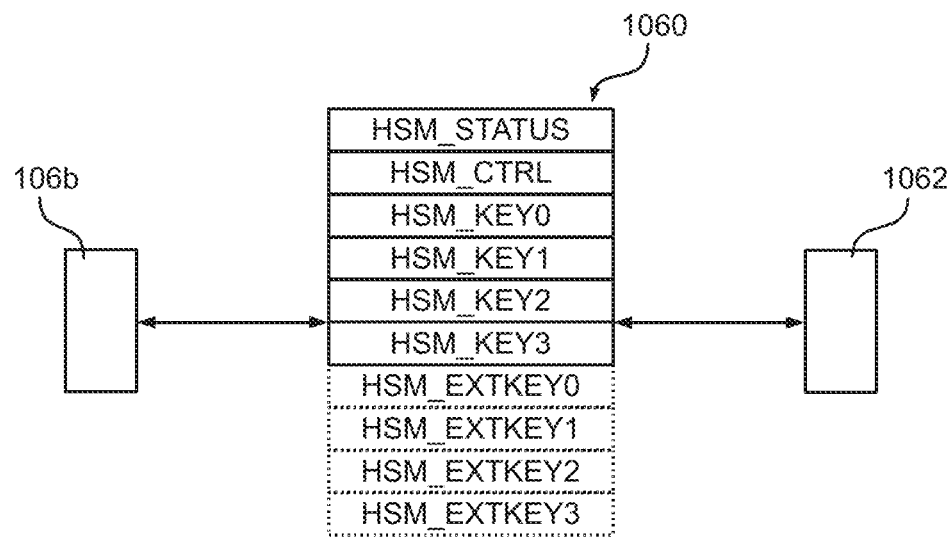
FIG. 7 shows an embodiment of an interface for loading cryptographic keys to the coprocessor of FIGS. 4 and 5.

For example, FIG. 7 shows an embodiment of the interface 1060. Specifically, in the embodiment considered, the interface 1060 includes the following registers, which are preferably separately addressable by the microprocessor 106b, e.g. in the form of SFR of the microprocessor 106b: a status register HSM_STATUS including data identifying the status of the coprocessor 106c, e.g., the status of the key management circuit 1064; a control register HSM_CTRL used to control a write operation of a cryptographic key, such as data used to specify a slot number in the key storage memory 1064; and one or more registers for storing the cryptographic key to be written to the key storage memory 1064, such as (in case of 32 bit registers) four registers HSM_KEY0-HSM_KEY3 for storing a 128-bit cryptographic key, and optionally further four registers HSM_EXTKEY0-HSM_EXTKEY3 for storing additional 128-bit of a 256-bit cryptographic key.

Figure 8:
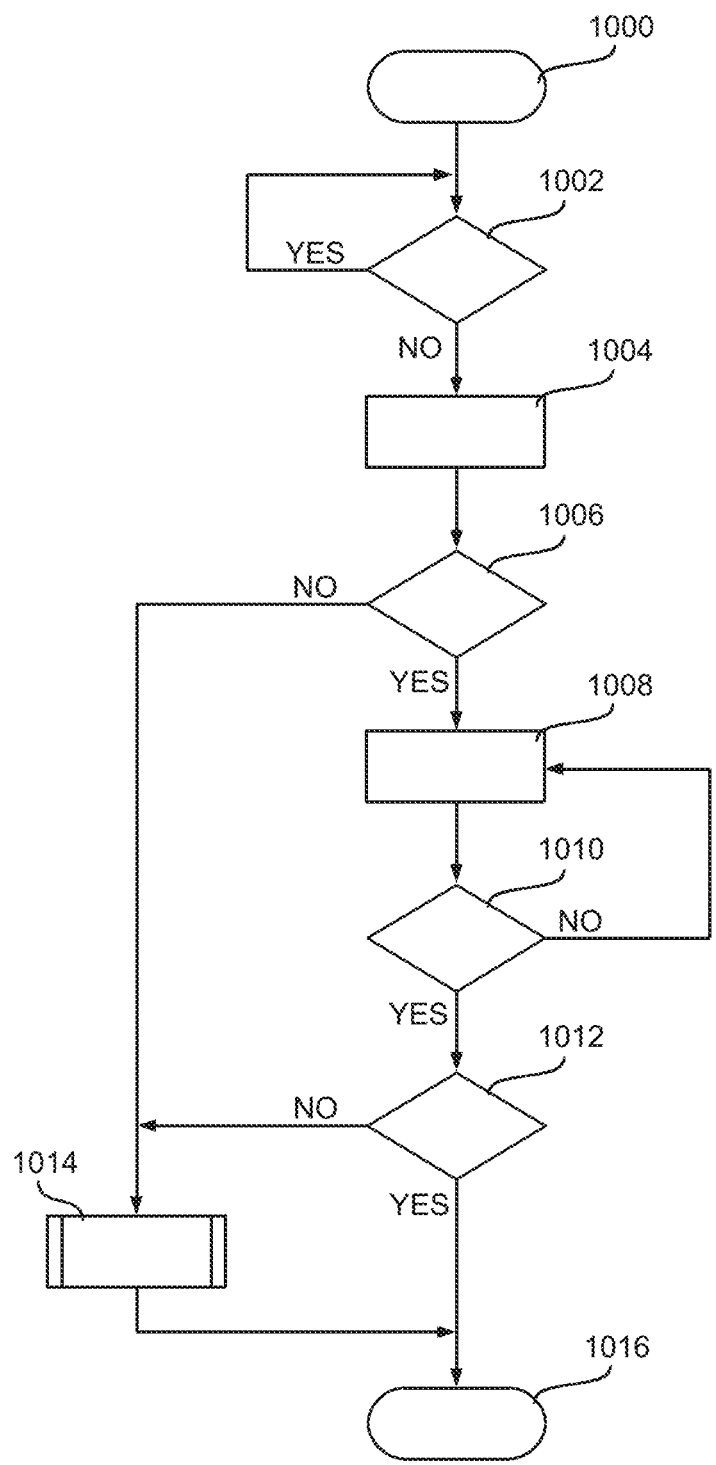
FIG. 8 is a flow-chart illustrating an embodiment of the operations performed to loading cryptographic keys to the coprocessor of FIGS. 4 and 5.

For example, FIG. 8 shows a flow chart of an embodiment of the operations performed by the microprocessor 106b in order to write a cryptographic key to the key storage memory 1064.

After a start step 10000, the microprocessor 106b may verify at a step 1002 whether the cryptographic coprocessor 106c is busy. For example, the microprocessor 106b may monitor for this purpose a busy flag of the status register HSM_STATUS. For example, the busy flag may be set when the coprocessor 106c is executing a cryptographic service or a key write operation.

Accordingly, in case the cryptographic coprocessor is busy (output "YES" of the verification step 1002), the microprocessor 106b may return to the step 1002.

Conversely, in case the cryptographic coprocessor is not busy (output "NO" of the verification step 1002), the microprocessor 106b provides at a step 1004 control information to the interface 1060. For example, the microprocessor 106b may write a slot number to the control register HSM_CTRL.

Next, the microprocessor 106b may verify at a step 1006 whether the cryptographic coprocessor 106c has activated the update procedure. For example, the microprocessor 106b may monitor for this purpose a load flag of the status register HSM_STATUS or the control register HSM_CTRL.

In case the cryptographic coprocessor 106c has not activated the update procedure (output "NO" of the verification step 1006), the microprocessor 106b may proceed to an error handler routine 1014.

Conversely, in case the cryptographic coprocessor 106c has activated the update procedure (output "YES" of the verification step 1006), the microprocessor 106b may provide the new cryptographic key to the interface 1060.

For example, in the embodiment considered, the microprocessor 106b writes at a step 1008 a first bit-sequence (e.g., the first 32 bit) of the new cryptographic key to the register HSM_KEY0. Next the microprocessor 106b verifies at a step 1010 whether the complete cryptographic key has been written to the interface 1060. In case, the complete cryptographic key has not been written to the interface 1060 (output "NO" of the verification step 1010), the microprocessor 106b returns to the step 1008 for writing the next bit-sequence (e.g., the next 32 bit) of the new cryptographic key to the register HSM_KEY1, i.e., the steps 1008 and 1010 are repeated for the following bit sequences until the complete cryptographic key has been stored in the registers HSM_KEY0-HSM_KEY3 and possibly the registers HSM_EXTKEY0-HSM _EXTKEY3.

Accordingly, in case the microprocessor 106b has provided the new cryptographic key to the interface 1060 (output "YES" of the verification step 1010), the microprocessor 106b may verify at a step 1012 whether the cryptographic coprocessor 106c has updated the cryptographic key. For example, the microprocessor 106b may monitor for this purpose a status flag of the status register HSM_STATUS. For example, the status flag may be set when the coprocessor 106c has updated the cryptographic key.

Accordingly, in case the cryptographic coprocessor 106c has updated the cryptographic key (output "YES" of the verification step 1012), the microprocessor 106b ends the update procedure at a stop step 1016.

Conversely, in case the cryptographic coprocessor 106c has not updated the cryptographic key (output "NO" of the verification step 1012), the microprocessor 106b may proceed to the error handler routine 1014.

Figure 9:
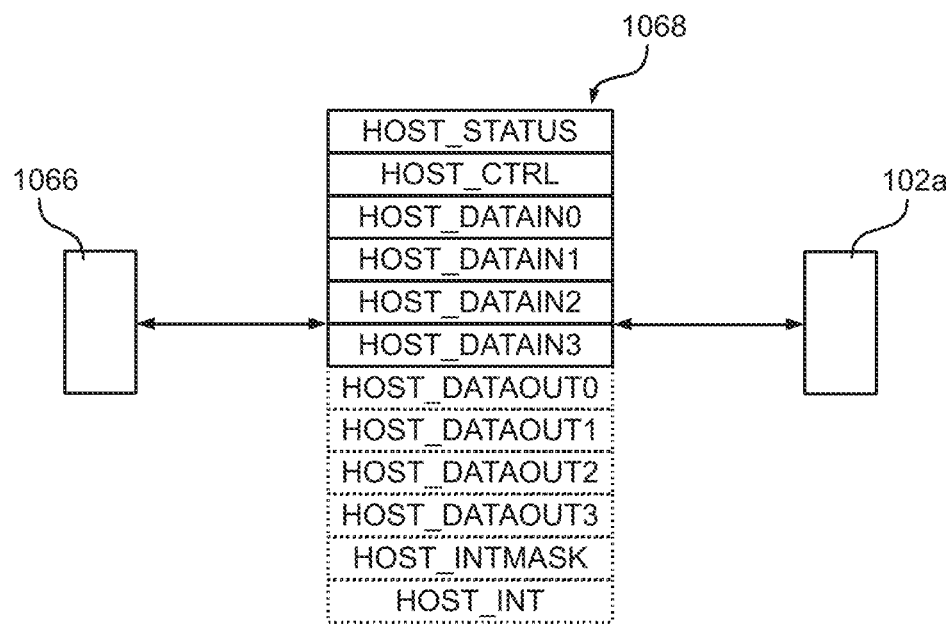
FIG. 9 shows an embodiment of an interface for providing a cryptographic service request to the coprocessor of FIGS. 4 and 5.

Similarly, FIG. 9 shows an embodiment of the interface 1068. Specifically, in the embodiment considered, the interface 1068 includes the following registers, which are preferably separately addressable by the processing unit 102b, e.g. in the form of SFR of the processing unit 102a: a status register HOST_STATUS including data identifying the status of the coprocessor 106c, e.g., the status of the cryptographic engine 1066; a control register HOST_CTRL used to control the execution of cryptographic services; one or more registers for storing the source data SD to be processed, such as four registers HOST_DATAIN0-HOST _ DATAIN3; one or more optional registers for storing the processed data DD, such as four registers HOST_ DATAOUT0-HOST_DATAOUT3; generally, these registers are optional because the processed data DD may also be stored in the registers used to receive data, e.g., the registers HOST_DATAIN0-HOST_DATAIN3; and one or more optional registers for configuring an interrupt, such as an interrupt mask register HOST_INTMASK used to activate or deactivate the generation of one or more interrupts and an interrupt register HOST_INT containing the interrupts which have been set by the coprocessor 106c.

Figure 10:
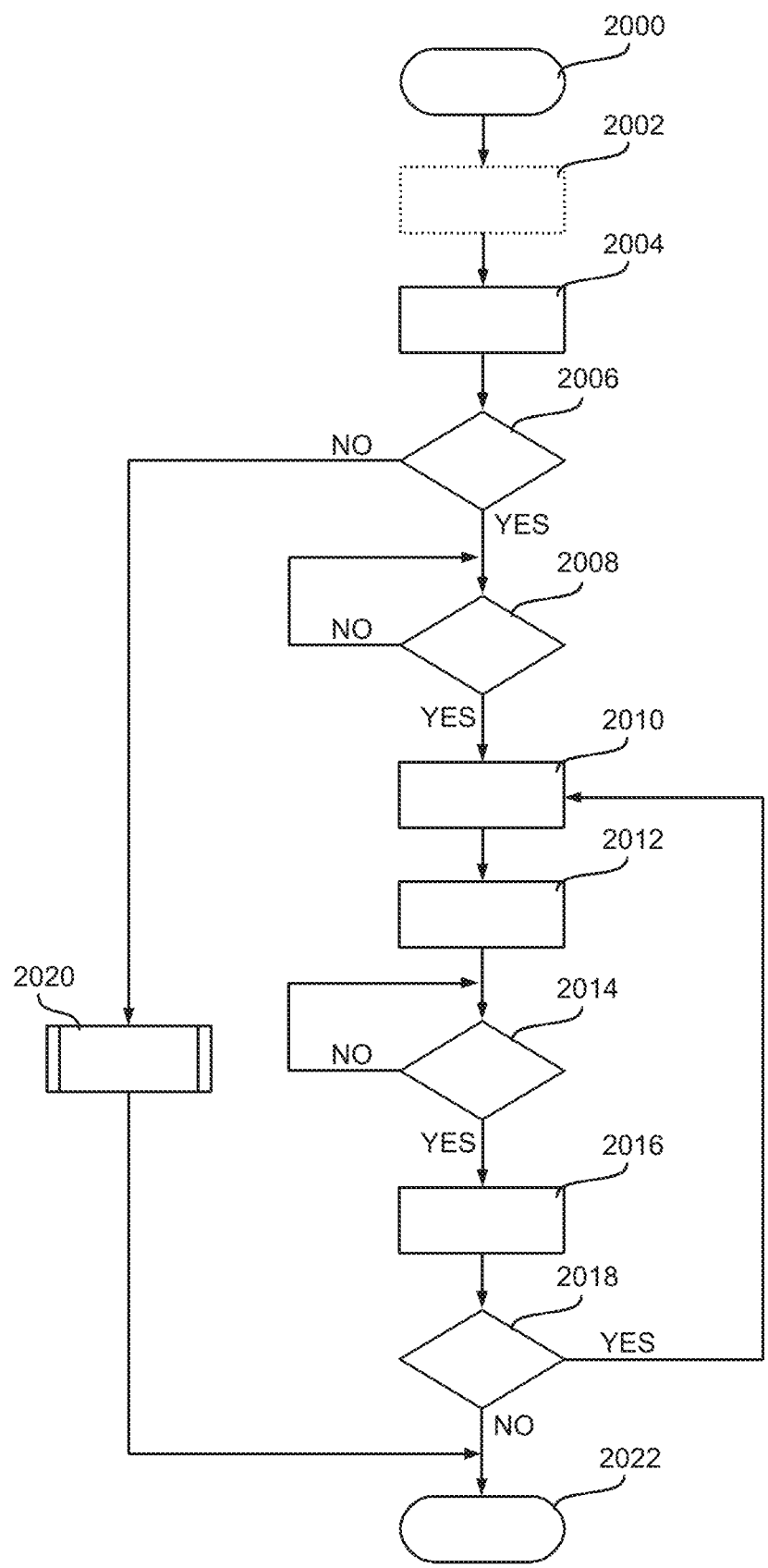
FIG. 10 is a flow-chart illustrating an embodiment of the operations performed to execute an encryption or decryption operation with the coprocessor of FIGS. 4 and 5.

For example, FIG. 10 shows a flow chart of an embodiment of the operations performed by the processing unit 102b in order execute an encryption or decryption service.

After a start step 2000, the processing unit 102a provides at a step 2004 control information to the interface 1068 for starting a new operation. For example, the processing unit 102a may write the content of the control register HOST_CTRL in order to: select the operation to be performed, such as CBC/EBC encryption or decryption; and select a cryptographic key, e.g. by specifying a slot number in the key storage memory 1064.

In case a Cipher Block Chaining (CBC) operation has been selected, the processing unit 102a may also provide respective initialization data to be used for the first block chaining operation. For example, in the embodiment considered, the processing unit 102a may provide at a step 2002 preceding the step 2004 these data, e.g. by writing the initialization data into the registers HOST_DATAIN0-HOST_DATAIN3. Accordingly, when the control register HOST_CTRL indicates at the step 2004 that a CBC operation has to be performed, the cipher engine 1066 may store the content of the registers HOST_DATAIN0-HOST_DATAIN3 in an internal register containing the initialization data to be used for the block chaining operation.

Next, the processing unit 102a may verify at a step 2006 whether the selected cryptographic key is valid. For example, for this purpose the processing unit 102a may verify a key valid flag of the status register HOST_STATUS.

In case the selected cryptographic key is invalid (output "NO" of the verification step 2006), the processing unit 102a may proceed to the error handler routine 2020.

Conversely, in case the selected cryptographic key is valid (output "YES" of the verification step 2006), the processing unit 102a may verify at a step 2008 whether the coprocessor 106c is ready, e.g., by monitoring a busy flag in the status register HOST_STATUS.

In case the coprocessor 106c is not ready (output "NO" of the verification step 2008), the processing unit 102a may return to the verification step 2008.

Conversely, in case the coprocessor 106c is ready (output "YES" of the verification step 2008), the processing unit 102a may provide the source data SD to be processed to the cryptographic coprocessor 106c.

For example, in the embodiment considered, the processing unit 102a provides for this purpose sequentially blocks of source data SD to the coprocessor 106c and reads the processed data DD.

Specifically, in the embodiment considered, the processing unit 102a writes at a step 2010 a first block of the source data SD to the registers HOST_DATAIN0-HOST_DATAIN3 and starts at a step 2012 the processing of the data, e.g. by setting a flag in the control register HOST_CTRL. Next, the processing unit 102a may verify at a step 2014 whether the coprocessor 106c has completed the processing, e.g., by monitoring a busy flag in the status register HOST_STATUS.

In case the coprocessor 106c is still processing the data (output "NO" of the verification step 2014), the processing unit 102a may return to the verification step 2014. Conversely, in case the coprocessor 106c has completed the processing (output "YES" of the verification step 2014), the processing unit 102a may read at a step 2016 the processed data DD, e.g., read the content of the registers HOST_DATAOUT0-HOST_DATAOUT3.

Next, the processing unit 102a may verify at a step 2018 whether at least a further block of source data SD has to be processed.

In case further source data SD have to be processed (output "YES" of the verification step 2018), the processing unit 102a returns to the step 2010 for processing the next block of source data SD. Conversely, the processing unit 102a terminates the procedure at a stop step 2022.

Figure 11:
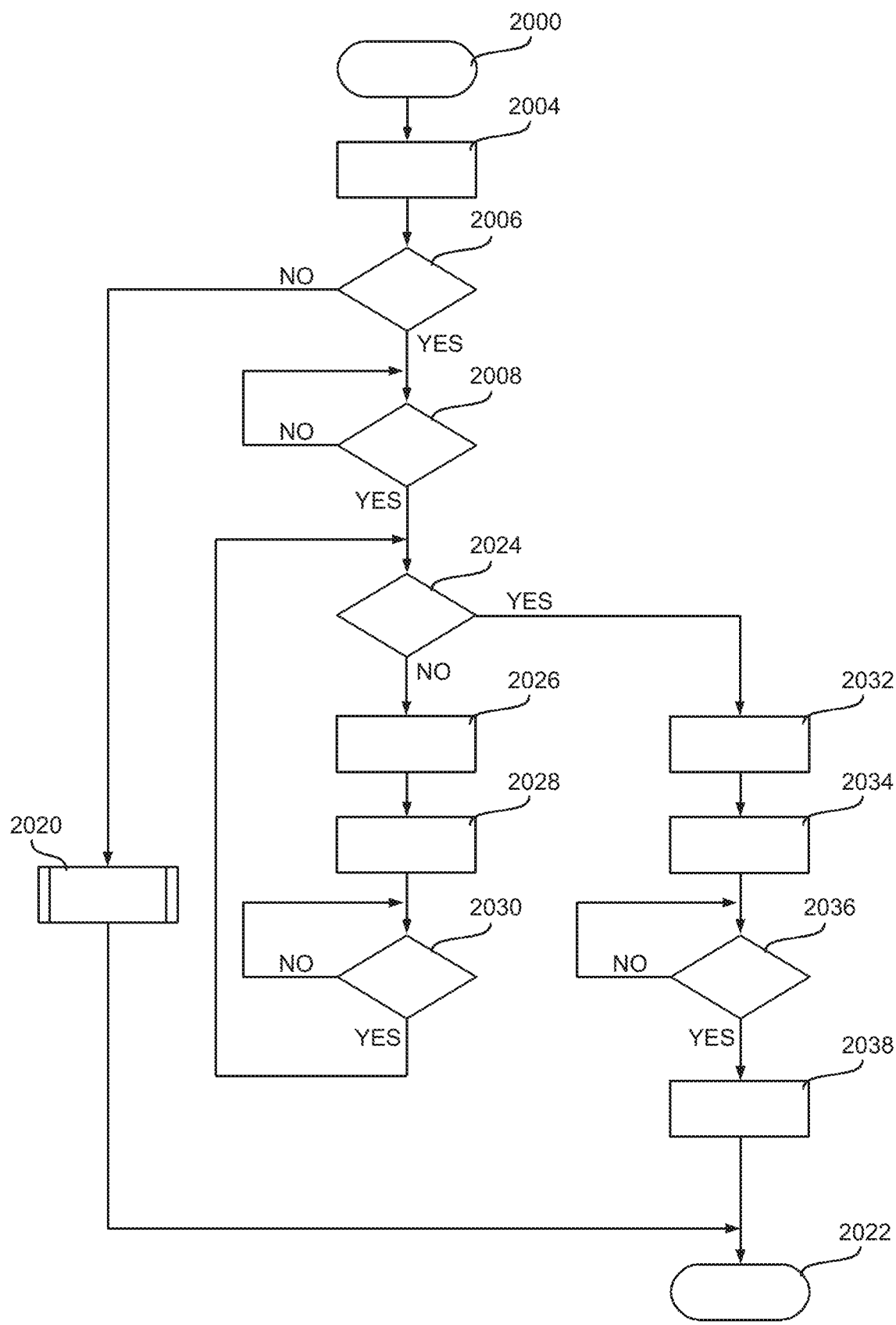
FIG. 11 is a flow-chart illustrating an embodiment of the operations performed to execute a CMAC generation operation with the coprocessor of FIGS. 4 and 5.

FIG. 11 shows a flow chart of an embodiment of the operations performed by the processing unit 102b in order execute a CMAC signature generation.

Generally, also in this case, the processing unit 102b performs the steps 2004, 2006 and 2008 (and possibly 2020 in case an error occurs) in order to select the ciphering service (in this case CMAC signature generation) and a respective ciphering key.

However, the processing of the source data SD at the steps 2010-2018 is slightly adapted because the processing unit 2016 does not have to read the processed data DD except for the last block of source data SD.

For example, once the coprocessor 106c is ready at the end of the verification step 2008, the processing unit 102a may verify at a step 2024 whether the current block of source data SD is the last block.

In case the current block of source data SD is not the last block (output "NO" of the verification step 2024) the processing unit 102b provides the current block of source data SD to the coprocessor 106c.

Specifically, in the embodiment considered, the processing unit 102a writes at a step 2026 the current block of the source data SD to the registers HOST_DATAIN0-HOST_DATAIN3 and starts at a step 2028 the processing of the data, e.g. by setting a flag in the control register HOST_CTRL.

Next, the processing unit 102a may verify at a step 2030 whether the coprocessor 106c has completed the processing, e.g., by monitoring a busy flag in the status register HOST_STATUS. In case the coprocessor 106c is still processing the data (output "NO" of the verification step 2030), the processing unit 102a may return to the verification step 2030.

Conversely, in case the coprocessor 106c has completed the processing (output "YES" of the verification step 2030), the processing unit 102a returns to the verification step 2024.

Accordingly, basically, the steps 2026, 2028 and 2030 correspond to the steps 2010, 2012 and 2014 described with respect to FIG. 10, but the readout step 2016 is missing.

Conversely, in case the current block of source data SD is the last block (output "YES" of the verification step 2024) the processing unit 102b provides the current block of source data SD to the coprocessor 106c, but this time reads the processed data field containing the result of the CMAC operation.

Specifically, in the embodiment considered, the processing unit 102a writes at a step 2032 the last block of the source data SD to the registers HOST_DATAIN0-HOST_DATAIN3 and starts at a step 2034 the processing of the data, e.g. by setting a flag in the control register HOST_CTRL. Preferably, a different flag is used in this case, signaling that the result of the CMAC operation should be written to the registers HOST_DATAOUT0-HOST_DATAOUT3.

Next, the processing unit 102a may verify at a step 2036 whether the coprocessor 106c has completed the processing, e.g., by monitoring a busy flag in the status register HOST- _STATUS. In case the coprocessor 106c is still processing the data (output "NO" of the verification step 2036), the processing unit 102a may return to the verification step 2036.

Conversely, in case the coprocessor 106c has completed the processing (output "YES" of the verification step 2036), the processing unit 102a may read at a step 2038 the processed data DD, e.g., the content of the registers HOST_DATAOUT0-HOST_DATAOUT3, and the procedure terminates at the stop step 2022.

Accordingly, in the embodiment considered, the processed data DD may contain the signature of the processed source data SD. Accordingly, when exchanging data between the various processing systems 10a, the data may include also the signature, permitting in this way, that the receiving processing system 10a may recalculate the signature and compare it with the received signature.

Figure 12:
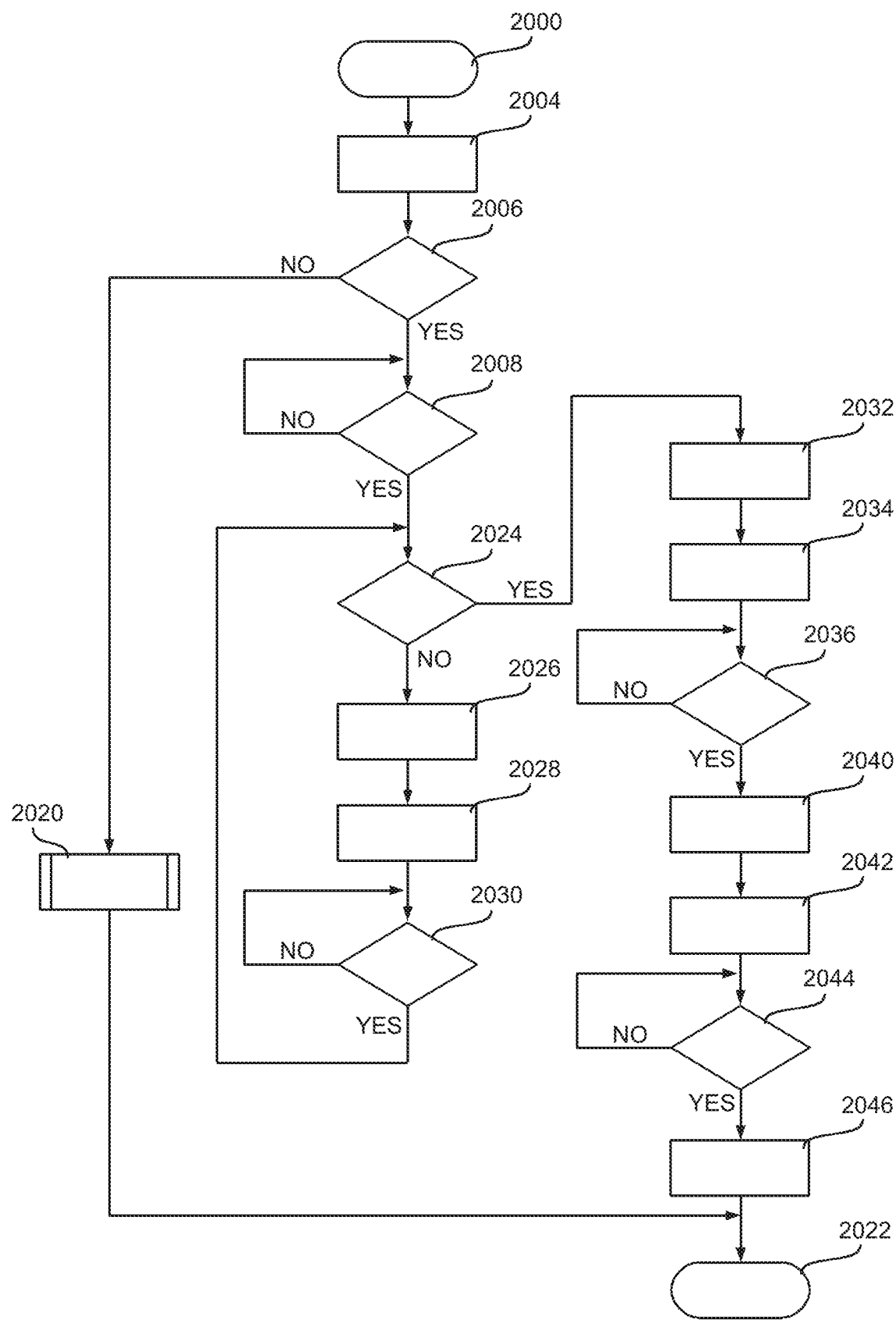
FIG. 12 is a flow-chart illustrating an embodiment of the operations performed to execute a CMAC verification operation with the coprocessor of FIGS. 4 and 5.

FIG. 12 shows a flow chart of an embodiment of the operations performed by the processing unit 102b in order execute such a CMAC verification via the coprocessor 106c.

Generally, most of the operations correspond to the operations already described with respect to FIG. 11, in particular the steps 2000-2036. However, instead of reading the CMAC signature at the step 2038, the processing unit 102a provides a reference CMAC signature, e.g., a received CMAC signature, to the coprocessor 106c and the coprocessor verifies the CMAC signature.

Accordingly, once all source data SD have been processed (steps 2000 to 2036 described in the foregoing), the processing unit 102a provides at a step 2040 the reference CMAC signature to the coprocessor 106c, e.g., by writing the reference CMAC signature to the registers HOST_DATAIN0-HOST_DATAIN3.

Next, the processing unit 102a starts at a step 2042 the verification of the CMAC signature, e.g. by setting a flag in the control register HOST_CTRL.

Next, the processing unit 102a may verify at a step 2044 whether the coprocessor 106c has completed the processing, e.g., by monitoring a busy flag in the status register HOST_STATUS. In case the coprocessor 106c is still processing the data (output "NO" of the verification step 2044), the processing unit 102a may return to the verification step 2044.

Conversely, in case the coprocessor 106c has completed the processing (output "YES" of the verification step 2044), the processing unit 102a may read the result of the verification operation, which may be stored, e.g., in the registers HOST_DATAOUT0-HOST_DATAOUT3 or the status register HOST_STATUS.

Accordingly, in the embodiment considered, the various cryptographic operations may be activated by the processing unit 102a with few operations by simply writing data to the register interface 1068. Moreover, the various cryptographic services may be activated with software instructions executed by the processing unit 102a. Once started, the coprocessor 106c may process the source data SD autonomously, and the operation may run at the speed of the processing unit 102a.

Moreover, in various embodiments, the source data SD to be processed (such as single CAN bus commands to be transmitted in encrypted form or encrypted CAN bus commands having been received) do not have to be stored first in a separate shared memory, but the processing unit 102a may pass the source data SD directly to the register interface 1068. Accordingly, the hardware secure module HSMa described in the foregoing permits to reduce the latency needed to process a cryptographic request.

As mentioned before, the crypto-engine 1066 may run at the clock speed CLK, i.e., the speed of the processing unit 102a. Accordingly, the coprocessor is split into 2 parts: one residing in the HSM domain (running at the HSM clock speed CLK_HSM), which is dedicated to the storage of key in the memory 1064, and the other residing in the host domain (running at the HOST clock speed CLK) which contains the crypto-engine 1066 (and the register I/F 1068) to process the data. Conversely, in the arrangement shown in FIGS. 3 and 4, the complete coprocessor 106c is embedded in the HSM.

Generally, the cryptographic coprocessor 106c described with respect to FIGS. 5 to 12 may also be used in the architectures described with respect to FIGS. 3 and 4. In this case, the interface 1068 (as described e.g. with respect to FIG. 9) may be connected to the microprocessor 106b and not the processing unit 102a. In this case, the various flow charts shown in FIGS. 8, 10, 11 and 12 may also be implemented in the microprocessor 106b. Moreover, the coprocessor 106c may also include two interfaces 1068 for the connection to the microprocessor 106b and the processing unit 102a, thereby permitting that both the microprocessor 106b and the processing unit 102a may run cryptographic services.

Cryptographic Key Management

In the embodiments described in the foregoing, the cryptographic key(s) to be used by the secure processing unit 106a are stored in a non-volatile memory 110 of the secure hardware module HSMa. Generally, this memory 110, or at least the memory areas containing the cryptographic key(s) are not accessible by the non-secure elements, e.g., the processing unit 102a. For example, in case the processing unit 106a is implemented at least in part with a microprocessor 106b or another type of programmable processing unit, such as a FPGA, the memory 110 may be the memory containing the firmware of such a programmable processing unit 106b.

However, storing the cryptographic key in a non-volatile memory creates some disadvantages. For example, it may be possible to read the content of the non-volatile memory 110 in order to obtain the cryptographic key. Similarly, when updating the firmware of the processing unit 106a, the cryptographic key may be read from the firmware file.

Accordingly, in various embodiments a key obfuscation technique is used to keep the cryptographic key secret. In this case, the cryptographic key (such as a symmetric key common to a plurality of processing systems 10) is stored in the non-volatile memory 110 in protected form, i.e., the cryptographic key remains protected even when the content of the non-volatile memory 110 or the firmware file is read. For example, in various embodiments, the cryptographic key may be stored in the memory 110 in encrypted form, i.e. the cryptographic key itself is encrypted with a further key, referred to in the following as master key.

Accordingly, while a third party cannot use the encrypted cryptographic key, the processing unit 106a may decrypt the cryptographic key with the master key, and use the decrypted cryptographic key in order to process given source data SD.

For example, in the architectures described in the foregoing, in which the processing unit 106a includes a microprocessor 106b and a coprocessor 106c, the coprocessor 106c, e.g., the key storage memory 1064, may already have stored the master key, e.g. in a reserved slot. In this case, the microprocessor 106b may use the cryptographic services provided by the coprocessor 106c in order to decrypt the cryptographic key. Specifically, microprocessor 106b may perform the following operations by means of software instructions:

1) read the encrypted cryptographic key from the non-volatile memory 110;

2) provide the encrypted cryptographic key to the coprocessor 106c, specifying the slot number of the master key;

3) read the decrypted cryptographic key; and 4) store the decrypted cryptographic key into an empty slot of the cryptographic coprocessor.

However, even though the decryption itself is done in hardware using the cryptographic coprocessor 106c, the microprocessor 106b has access to the decrypted cryptographic key. Generally, the HSM software is considered more robust and secure, as its access is limited by specific additional protections, instantiated exactly for the reason to make the HSM a secured and sealed element. However, e.g., by manipulating the firmware of the processing unit 106a, the cryptographic key may still be read. Accordingly, in various embodiments, the decryption of the cryptographic key and storage in the key storage memory 1064 is implemented directly in the hardware coprocessor 106c, thereby avoiding that the microprocessor 106b gains access to the decrypted cryptographic key.

A second problem may be related to the protection of the cryptographic services during run-time. For example, in various embodiments, each cryptographic key may have associated one or more attributes, which limit the key usability according to a user-defined policy. For example, a key may be marked to be usable for a single operation, or usable only for encryption but not for decryption. Generally, these additional attributes may be verified by the microprocessor 106b (e.g., in the architectures described with respect to FIGS. 3 and 4) or the coprocessor 106c (e.g., in the architectures described with respect to FIGS. 5 and 6).

Figure 13:
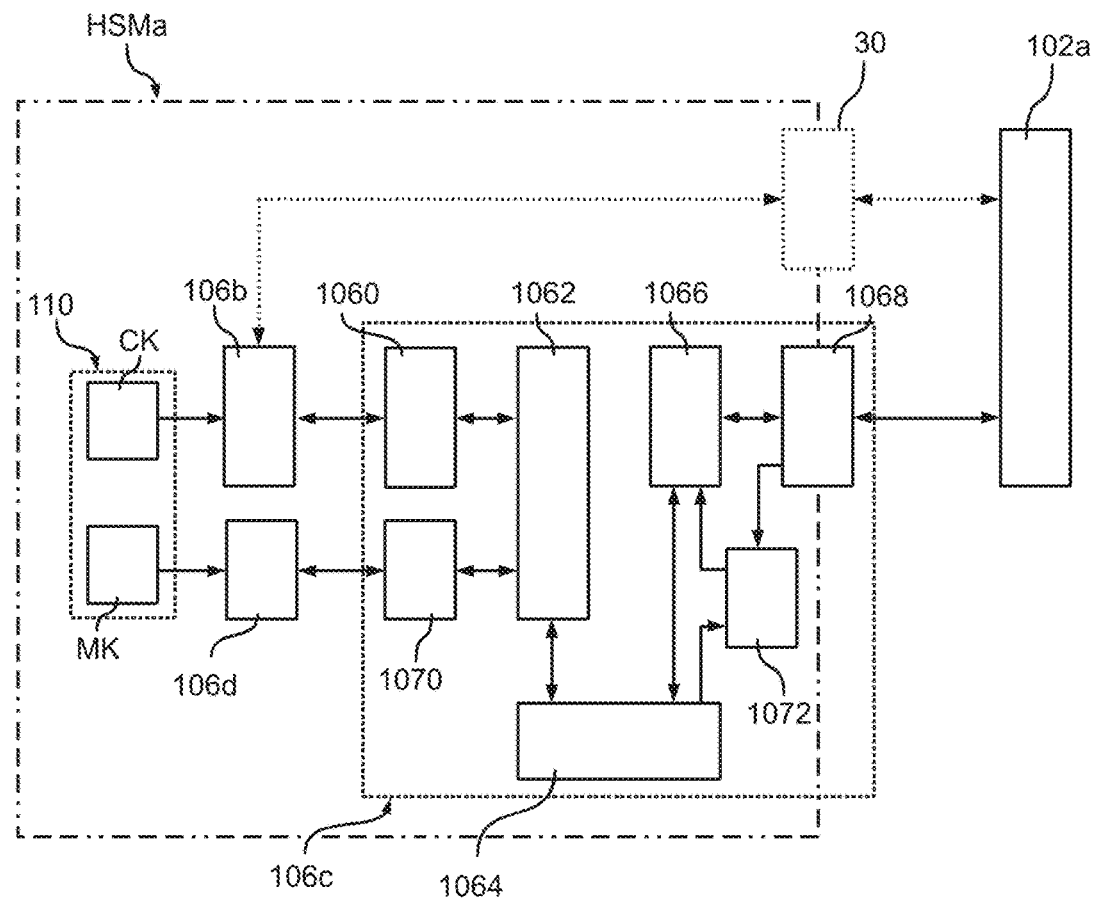
FIG. 13 shows a further embodiment of a hardware secure module including a hardware coprocessor.

FIG. 13 shows an embodiment of a hardware secure module HSMa, which include two additional blocks, which in general may be used in combination or separately.

Specifically, in the embodiment considered, the hardware secure module HSMa includes a hardware configuration module 106d configured to read one or more master keys MK from a non-volatile memory, e.g. the memory 110, and provide the one or more master keys MK to the coprocessor 106c. For this purpose, the coprocessor 106c may include an additional interface 1070. Accordingly, in this case, the hardware module 106d may read one or more master keys MK from the memory 110 and the microprocessor 106b may read one or more cryptographic keys CK from the memory 110, wherein the cryptographic keys CK may be in encrypted from.

Moreover, in the embodiment considered, the hardware secure module HSMa includes an attribute processing block 1072. Specifically, as will be described in the following, the key storage memory 1064 may include for each slot, i.e. for each cryptographic key, one or more attributes. Specifically, the attribute processing block 1072 may enable or disable, or generally control, the cryptographic services provided by the crypto engine 1066.

Figure 14:
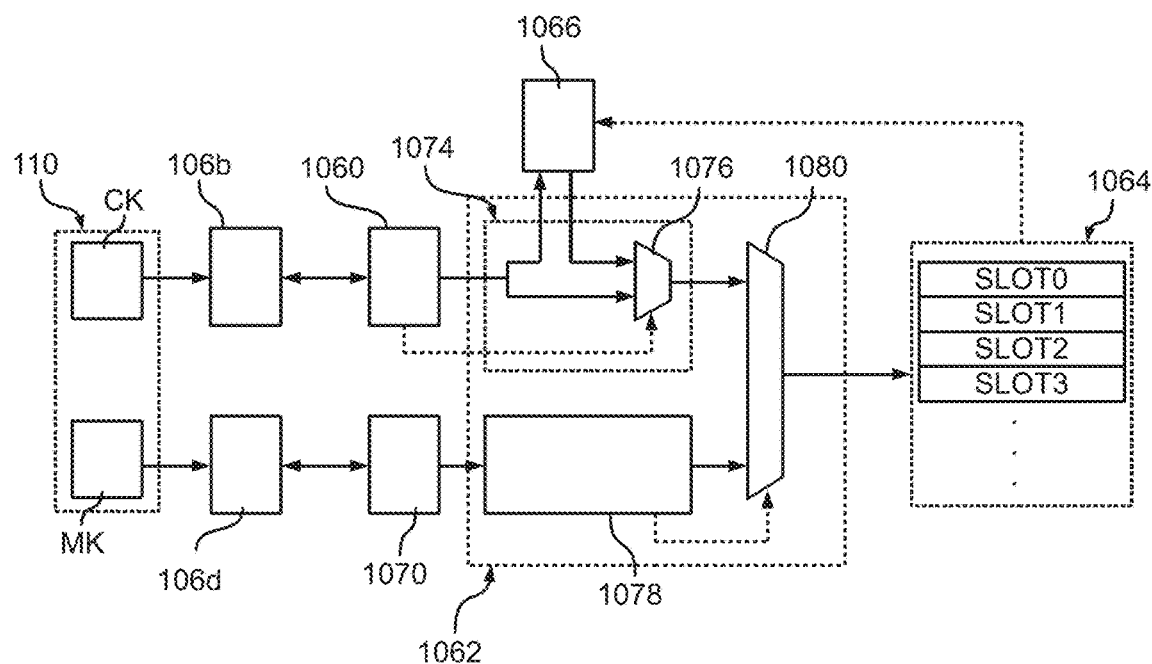
FIG. 14 shows an embodiment of the key management in the hardware coprocessor of FIG. 13.

FIG. 14 shows a possible embodiment of the key management operations of the coprocessor 106c.

In the embodiment considered, the key storage memory 1064 includes a plurality of slots SLOT0, SLOT1, SLOT2, SLOT3, etc. wherein each slot may be used to store a key.

As described in the foregoing, the coprocessor 106c includes a first interface 106 for receiving cryptographic key from the microprocessor 106b. For example, as described with respect to FIG. 7, the interface 1060 may be a register interface, e.g. in the form of special function registers of the microprocessor 106b. Accordingly, as described with respect to FIG. 8, the microprocessor 106b may write one or more cryptographic keys CK to the interface 1060. For example, in the embodiment considered, the one or more cryptographic keys CK are stored in a non-volatile memory 110, e.g. the non-volatile memory including the firmware of the microprocessor 106b. Accordingly, the microprocessor 106b may read a cryptographic key CK from the memory 110 and write the key to the interface 1060 in order to update a key in the key storage memory 1064.

Moreover, the coprocessor 106c includes a second interface 1070 for receiving cryptographic key from a hardware configuration module 106d. Accordingly, in the embodiment considered, the hardware configuration module 106d may write one or more master keys MK to the interface 1070. For example, in the embodiment considered, the one or more master keys MK are stored in the non-volatile memory 110, e.g., the non-volatile memory including the firmware of the microprocessor 106b.

In various embodiments, even though the cryptographic keys CK and the master keys MK could be stored in the same memory 110, the one or more master keys MK are stored in memory locations, which are not accessible neither by the processing unit 102a nor the microprocessor 106b, e.g., by configuring the memory interface of the memory 110.

For example, in various embodiments, the hardware configuration module 106d is the configuration module of the hardware secure module HSMa, which is configured to read one or more configuration data from a non-volatile memory during the start-up of the hardware secure module HSMa and distribute these configuration data among various blocks. For example, possible embodiments of such a hardware configuration module and respective configuration interfaces are described in the Italian patent application IT 102017000050166, which is incorporated herein by reference. Specifically, the hardware configuration module 108 of document IT 102017000050166 may be used as configuration module 106d and a configuration data client 112 of document IT 102017000050166 may be used as interface 1070. Accordingly, in this case, the one or more master keys MK may be distributed together with the configuration data CD of document IT 102017000050166.

In the embodiment considered, the interfaces 1060 and 1070 provide the respective keys to the hardware key management unit 1062 configured to store the keys in the key storage memory 1064 of the coprocessor 106c.

For example, in the embodiment considered, the interface 1070 provides the one or more master keys MK to a master key loading circuit 1078. Specifically, the master key loading circuit 1078 is configured to store the one or more master keys MK received via the interface 1070 in the key storage memory 1064 of the coprocessor 106c. Similarly, the interface 1060 provides the one or more cryptographic keys CK to a cryptographic key loading circuit 1074. Specifically, the cryptographic key loading circuit 1074 is configured to store the one or more cryptographic keys CK received via the interface 1060 in the key storage memory 1064 of the coprocessor 106c.

For example, as schematically shown in FIG. 14 a multiplexer 1080 may be used, which is configured to selectively connect the output of the master key loading circuit 1078 or the cryptographic key loading circuit 1074 to the key storage memory 1064. For example, in various embodiments, the key storage memory 1064 may be connected to: the master key loading circuit 1078 during the start-up of the hardware secure module HSMa, as indicated e.g. by the master key loading circuit 1078, and the cryptographic key loading circuit 1074, once the startup phase has ended.

Accordingly, in various embodiments, one or more master keys MK are already loaded into the key storage memory 1064, when the microprocessor 106b is activated and provides one or more cryptographic keys CK to the key management unit 1062.

In various embodiments, the cryptographic key loading circuit 1074 may handle both cryptographic keys in plaintext (i.e., not-encrypted) and encrypted cryptographic keys, i.e. the cryptographic key received via the interface 1060 may be encrypted or not. For example, in various embodiments, the control register HSM_CTRL may include a flag indicating whether the key registers HSM_KEY0-HSM_KEY3 and optionally HSM_EXTKEY0-HSM_EXTKEY3 contain an encrypted or not-encrypted cryptographic key.

In case the cryptographic key CK provided by the interface 1060 is in plaintext, i.e., not encrypted, the cryptographic key loading circuit 1074 may provide the cryptographic key CK (e.g., via the multiplexer 1080) to the key storage memory 1064 specifying also the slot in the key storage memory 1064, e.g. as indicated in the control register HSM_CTRL.

Conversely, in case the cryptographic key CK provided by the interface 1060 is encrypted, the cryptographic key loading circuit 1074 provides the encrypted cryptographic key CK to the crypto engine 1066 of the coprocessor 106c, the crypto engine 1066 of the coprocessor 106c decrypts the encrypted cryptographic key CK and the cryptographic key loading circuit 1074 provides the decrypted cryptographic key CK (e.g., via the multiplexer 1080) to the key storage memory 1064 specifying also the slot in the key storage memory 1064, e.g. as indicated in the control register HSM_CTRL. In case a plurality of master keys MK may be used, the control register HSM_CTRL may include also a bit sequence for selecting a given master key in the key storage memory 1064.

For example, the selection between the not-encrypted or the decrypted cryptographic key is schematically implemented with a multiplexer 1076 driven by the interface 1060, e.g., a flag in the control register HSM_CTRL.

Accordingly, in the embodiment considered, the key management unit 1062 is used to install keys into the key storage memory 1064 of the cryptographic coprocessor 106c. Specifically, the key management unit 1062 may be used to install one or more master keys (i.e., keys which do not pass through the microprocessor 106b and which may be used, e.g., to decrypt encrypted cryptographic keys), cryptographic keys in plaintext (i.e., not encrypted), and encrypted cryptographic key.

The key loading by means of the configuration module 106d and the master key loading module 1078 is mostly targeted to load one or more master key. However, in general, the same blocks may also be used to pre-load cryptographic keys in plaintext to the key storage memory 1064. In fact, the crypto engine 1066 may be configured to use a master key (as specified e.g. via additional attributes identifying that the key is a master key) only for decrypting cryptographic keys received via the interface 1060. Conversely, the crypto engine 1066 may be configured to use the other cryptographic keys (as specified e.g. via additional attributes identifying that the key is not a master key) only for processing data received via the interface 1068.

Specifically, in the embodiments described, the configuration module 106d, the interface 1070 and the master key loading module 1078, representing essentially a pre-loading module, may be activated only during the start-up phase of the hardware secure module HSMa. Moreover, the key management unit 1062 may also block any overwrite operation to the slots in the key storage memory 1064 containing master keys and/or pre-loaded cryptographic keys (as specified e.g. via additional attributes which will be described in greater detail in the following).

In various embodiments, the microprocessor 106b may thus submit via the interface 1060 one or more further cryptographic keys CK. In the embodiment considered, this cryptographic key CK may be stored in a memory 110 of the hardware secure module HSMa, e.g. the program memory. Generally, one or more cryptographic keys CK may also be received, e.g., from the processing 102a, which in turn may receive the cryptographic keys CK from a further processing system 10. For example, the cryptographic keys CK may be sent (e.g., in encrypted form) through some protected communication channel, such as a CAN network that supports encryption. Specifically, in various embodiments, the cryptographic key CK may be provided to the coprocessor 106c in plaintext or encrypted (possibly specifying the master key MK to be used to encrypt the cryptographic key CK).

Accordingly, the key management module 1062 permits to: install at least one master key or pre-loaded cryptographic key during the start-up stage without any software intervention; install at least one encrypted cryptographic key by means of software instructions executed by the microprocessor 106b; or install at least one cryptographic key in plaintext (such as keys having already been decrypted by the microprocessor 106b via software instructions) by means of software instructions executed by the microprocessor 106b.

Accordingly, in the embodiments considered, the microprocessor 106a does not gain access to the master key(s) MK and possible pre-loaded cryptographic keys.

As mentioned before, in order to protect the keys further, e.g., from overwriting operations, or for limiting the usability of the keys (e.g., a master key MK may only be used to decrypt cryptographic keys CK received via the interface 1060), it may be useful to associate with the keys stored in the key storage memory 1064 one or more attributes.

Figure 15:
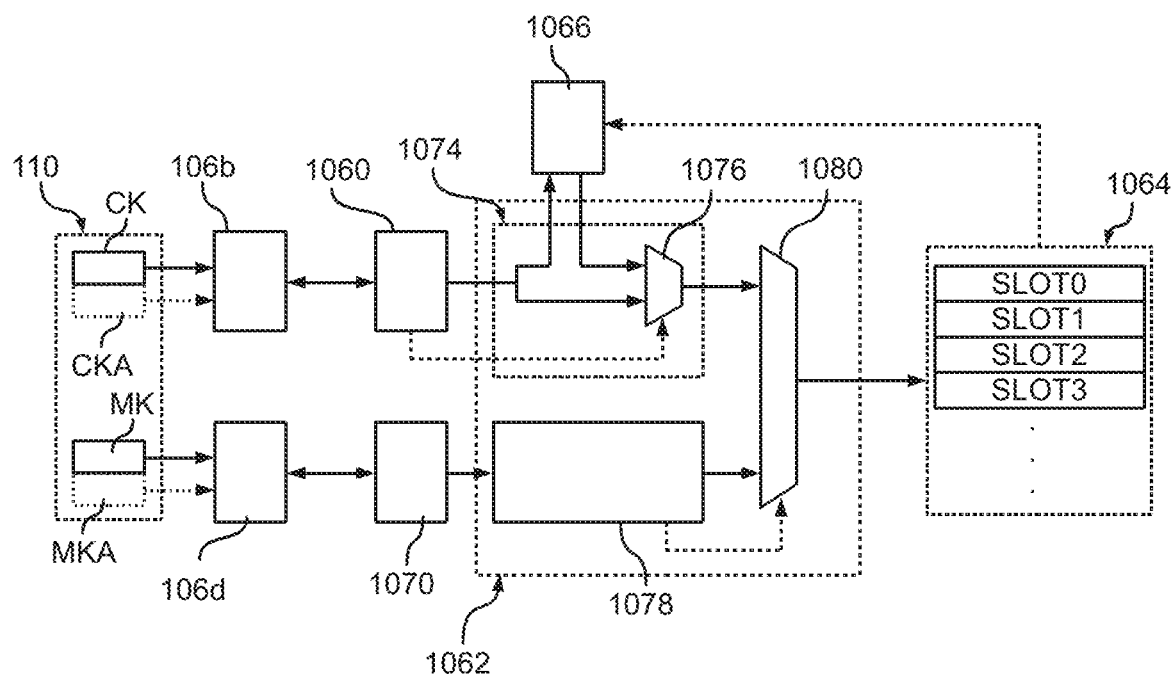
FIGS. 15 and 16 show an embodiment of the management of attributes associated with the keys used in the hardware coprocessor of FIG. 13.
Figure 16:
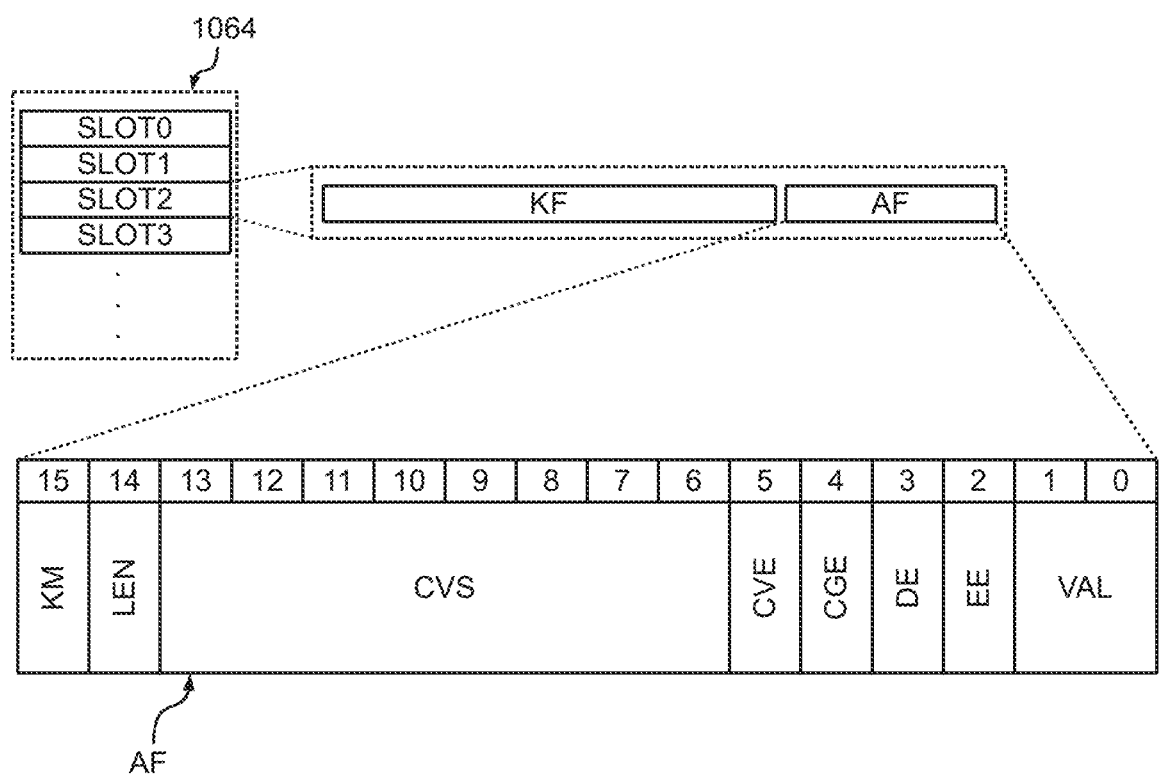

For example, FIGS. 15 and 16 show an embodiment of key management operations, wherein the key storage memory 1064 includes for each slot not only a key field KF for storing a key, but also an attribute field AF for storing attributes associated with the respective key.

For example, in the embodiment considered, the key management circuit 1062 is configured to write the content of the attribute field AF when the key management circuit 1062 writes the content of a respective slot in the key storage memory 1064.

For example, in the embodiment considered, the master key loading circuit 1078, when writing a given key to a key field KF of a given slot, may also write the respective attribute field AF.

For example, in various embodiments, the master key loading circuit 1078 may only receive master keys MK from the configuration module 106d. In this case, the master key loading circuit 1078 may automatically generate respective attributes, which may, e.g., identifying that the key written to the respective slot is a master key, and/or limit the usability of the key, such as specifying that the key may only be used to process data received via the interface 1060, may not be overwritten and/or may only be used for decryption operations.

Conversely, in case the master key loading circuit 1080 may receive different types of key, such as master keys and pre-loaded cryptographic keys, or also master keys having a different usability, one or more of the attributes may also be stored together with the master keys MK (and similarly the other keys). For example, in the embodiment shown in FIG. 15, the attributes MKA associated with a given master key MK, or generally with each key loaded by the configuration module 106d, are stored together with the respective key in the memory 110. Accordingly, when writing the master key(s) MK to the memory 110, the developer may also define the respective usability of the key.

Accordingly, in this case, the configuration module 106d may also read the attribute MKA associated with each of the master key MK from the memory 110 and the master key loading circuit 1080 may write them to the attribute field AF of the respective slot in the key storage memory 1064.

Similarly, the cryptographic key loading circuit 1074, when writing a given key to a key field KF of a given slot, may also write the respective attribute field AF. For example, the cryptographic key loading circuit 1074 may receive the attribute CKA associated with a given cryptographic key CK also from the microprocessor 106b. For example, similar to the master key, these attributes CKA may be stored with the cryptographic keys CK in the memory 110. Generally, this operation is purely optional, because the cryptographic keys CK received via the interface 1060 may not require any particular limitation, and an "unwritten" attribute field AF could represent the default configuration to be used by the crypto engine 1066, thereby identifying that the key written to the respective slot is a cryptographic key, and/or limiting the usability of the key, such as specifying that the key may only be used to process data received via the interface 1068.

For example, as shown in FIG. 16, the attribute field AF may include one or more of the following sub-fields:

validity field VAL, encoded e.g. with bits [1:0], which may be used to specify, e.g. whether the respective key is not valid anymore, the key is valid only for a single operation (one time only), or the key is valid multiple times;

encryption enable field EE, encoded e.g. with bit [2], which may be used to indicate that the respective key may be used for encryption operations;

decryption enable field DE, encoded e.g. with bit [3], which may be used to indicate that the respective key may be used for decryption operations;

CMAC generation field CGE, encoded e.g. with bit [4], which may be used to indicate that the respective key may be used for CMAC generation operations;

CMAC verification field CVE, encoded e.g. with bit [5], which may be used to indicate that the respective key may be used for CMAC verification operations;

CMAC verification size field CVSE, encoded e.g. with bits [13:6], which may be used to specify the minimum data size for CMAC verification operations performed with the respective key;

length field LEN, encoded e.g. with bit [14], which may be used to indicate that the respective key is either a 128 or 256-bit key; and/or key-mode field KM, encoded e.g. with bit [15], which may be used to indicate the type of the key, such as master key or cryptographic key, which e.g. may limit the usability of the key for processing data received either via the interface 1060 or the interface 1068, and/or the possibility to overwrite the respective slot.

Generally, based on the specific application and the crypto services supported by the crypto engine 1066, not all of the above attributes have to be supported. For example, in various embodiments, the attribute field AF may only be used for the cryptographic service requests received via the interface 1068, while the processing of the cryptographic keys received via the interface 1060 may be permitted always. For example, in this case the key-mode field KM would be superfluous, because the usability of the key may be limited via the fields EE, DE, CGE and CVE.

In various embodiments, the attribute field AF may thus be used by the attribute processing block 1072 (see FIG. 13). Specifically, in various embodiments, the attribute processing block 1072 is a hardware block configured to analyze the content of the attribute field AF for a currently selected slot/key, when a new cryptographic operation has to be executed, for example at least for the requests received via the interface 1068 and possibly also for the requests received via the interface 1060.

Specifically, in various embodiments, the attribute processing block 1072 compares the attributes with the data specifying the cryptographic operation to be executed. Based on the result of the comparison, the attribute processing block 1072 may thus generate a signal activating or deactivating the execution of the requested cryptographic operation.

For example, based on the attributes supported, the attribute processing block 1072 may determine whether the selected key is still valid, whether the key functionality matches the requested cryptographic operation, etc.

For example, as mentioned before the validity field VAL could support the following three possible values: the key is not valid anymore; the key is valid one time only; and the key is valid multiple times.

For example, in case the key is flagged as valid one time only and once having executed a requested operation, the attribute processing block 1072 may change the value of the field to "not valid anymore".

Moreover, as mentioned before, the attribute processing block 1072 may verify whether the requested type of operation is permitted by verifying the content of the corresponding field enabling or disabling the respective type of operation, e.g. the encryption enable field EE, the decryption enable field DE, the CMAC generation field CGE or the CMAC verification field CVE.

Finally, the CMAC Verify Size attribute may be used to cut the verification of a CMAC signature to a certain number of bits. Specifically, given a certain length (i.e. number of bits) of the CMAC signature, the attribute determines how many bits shall be used for the CMAC comparison. As mentioned before, the CMAC verification may be implemented directly in the crypto-engine 1066.

Accordingly, in various embodiments, the register interface 1060 used to load cryptographic keys CK into the memory 1064 may permit to specify these attributes.

For example, the attributes may be stored directly in the control register HSM_CTRL. In this case, the control register HSM_CTRL may include the following sub-fields: a load field, encoded e.g. with bit [31], specifying whether a load operation has been requested (e.g., "0" may indicate that no load operation has been requested and "0" may indicate that a load operation has been requested);

a size/length field (which is also stored in the length field LEN of the attribute field AF), encoded e.g. with bit [30], indicating whether the key has 128 or 256 bits, i.e. whether only the content of the register HSM_KEY0-HSM_KEY3 or also the content of the registers HSM_EXTKEY0-HSM_EXTKEY3 has to be loaded;

a plaintext field, encoded e.g. with bit [29], indicating whether the key is in plain-text or encrypted (see also the description of FIG. 14);

a master key slot field, encoded e.g. with bits [28:24], indicating the slot of the master key MK to be used to decrypt the key stored in the register HSM_KEY0-HSM_KEY3 (and possibly the registers HSM_EXTKEY0-HSM_EXTKEY3);

a CMAC verify size field (which is also stored in the CMAC size field CVS of the attribute field AF), encoded e.g. with bits [23:16], indicating the CMAC verify size attribute of the key;

a CMAC verify enable field (which is also stored in the CMAC verify enabled field CVE of the attribute field AF), encoded e.g. with bit [14], indicating whether the key may be used for CMAC verification operations;

a CMAC generation enable field (which is also stored in the CMAC generation enabled field CGE of the attribute field AF), encoded e.g. with bit [14], indicating whether the key may be used for CMAC generation operations;

a decryption enable field (which is also stored in the decryption enabled field DE of the attribute field AF), encoded e.g. with bit [13], indicating whether the key may be used for decryption operations;

an encryption enable field (which is also stored in the encryption enabled field EE of the attribute field AF), encoded e.g. with bit [12], indicating whether the key may be used for encryption operations;

a validity field (which is also stored in the key validity field VAL of the attribute field AF), encoded e.g. with bits [11:10], indicating the validity attribute of the key; and a slot field, encoded e.g. with bits [4:0], indicating the slot in the key storage memory 1064 to which the key and the respective attributes should be written.

Accordingly, the solutions described in the foregoing permit to define how to filter in HW the requested operation based on some key attributes and/or to enhance the key loading phase, enabling a flexible key loading mechanism, split between hardware and software, with the possibility to completely hide the decrypted key values to the software run by the microprocessor 106b.

Of course, without prejudice to the principle of the invention, the details of construction and the embodiments may vary widely with respect to what has been described and illustrated herein purely by way of example, without thereby departing from the scope of the present disclosure.

For example, while in the previous description reference was made mainly to a microprocessor 106b programmed via software instructions, the microprocessor 106b may also be replaced with another type of processing unit, such as another type of programmable processing unit, such as a FPGA, or a dedicated hardware block, being configured to perform the same functions.

What is claimed is:

1. A processing system, comprising:
a first processing unit driven with a first clock signal;
a second processing unit driven with a second clock signal, wherein a frequency of the second clock signal is less than a frequency of the first clock signal;
a cryptographic coprocessor communicatively coupled to the first processing unit and the second processing unit, wherein the first processing unit, the second processing unit and the cryptographic coprocessor are in close proximity within the processing system;
a transmission system coupled between the first processing unit and the second processing unit, the transmission system providing a transmission path between the first and second processing units outside the cryptographic coprocessor;

the cryptographic coprocessor comprising:
a key storage memory for storing a cryptographic key;
a first interface configured to receive source data to be processed directly from the first processing unit;
a hardware cryptographic engine driven with the first clock signal that is configured to process the source data as a function of the cryptographic key stored in the key storage memory;
a second interface configured to receive a first cryptographic key directly from the second processing unit; and
a hardware key management circuit driven with the second clock signal that is configured to store the first cryptographic key in the key storage memory.

2. The processing system according to claim 1, wherein the hardware cryptographic engine is configured to process the source data by selectively encrypting or decrypting the source data.

3. The processing system according to claim 2, further comprising a communication interface connected to the first processing unit, wherein the first processing unit is configured to:
send the source data to the first interface requesting encryption of the source data;
read encrypted source data from the first interface; and
transmit the encrypted source data via the communication interface.

4. The processing system according to claim 3, wherein the first processing unit is further configured to:
receive the encrypted source data via the communication interface;
send the encrypted source data to the first interface requesting decryption of the encrypted source data; and
read decrypted source data from the first interface.

5. The processing system according to claim 1, wherein the hardware cryptographic engine is configured to support an Advanced Encryption Standard operation.

6. The processing system according to claim 5, wherein the Advanced Encryption Standard operation comprises an Electronic Codebook encryption and decryption; a Cipher Block Chaining encryption and decryption; and/or a Cipher-based Message Authentication Code generation and verification.

7. The processing system of claim 1, wherein the transmission system comprises:
a transmitter circuit configured to receive data to be transmitted and configuration information from the first processing unit; and
a receiver circuit configured to receive the data to be transmitted and configuration information from the transmitter circuit that is read by the second processing unit.

8. The processing system of claim 7, wherein the transmission system further comprises:
a first register configured to receive and store the data to be transmitted and configuration information from the first processing unit and write the data to be transmitted and configuration information to the transmitter circuit; and
a second register configured to receive and store the data to be transmitted and configuration information from the transmitter circuit and write the data to be transmitted and configuration information to the receiver circuit.

9. The processing system according to claim 1, wherein the processing system is part of an electronic system of a vehicle, the first processing unit, the second processing unit and the cryptographic coprocessor being located within the vehicle.

10. A processing system comprising:
- a first processing unit driven by a first clock signal, the first processing unit having a first input/output and a separate second input/output;
- a second processing unit having a first input/output and a separate second input/output, wherein a frequency of the second clock signal is less than a frequency of the first clock signal;
- a cryptographic coprocessor communicatively coupled between the first input/output of the first processing unit and the first input/output of the second processing unit, wherein the first processing unit, the second processing unit and the cryptographic coprocessor are in close proximity within the processing system;
- a transmission system coupled between the second input/output of the first processing unit and the second input/output of the second processing unit;
- a non-volatile memory configured to store a first cryptographic key, wherein the second processing unit is configured to read the first cryptographic key from the non-volatile memory and send the first cryptographic key to the cryptographic coprocessor;
- wherein the cryptographic coprocessor comprises:
  - a key storage memory for storing a cryptographic key;
  - a first interface configured to receive source data to be processed directly from the first input/output of the first processing unit;
  - a hardware cryptographic engine driven with the first clock signal and is configured to process the source data as a function of the cryptographic key stored in the key storage memory;
  - a second interface configured to receive the first cryptographic key directly from the first input/output of the second processing unit; and
  - a hardware key management circuit driven with a second clock signal and is configured to store the first cryptographic key in the key storage memory.

11. The processing system according to claim 10, wherein the second processing unit is a microprocessor.

12. The processing system according to claim 11, wherein the second interface is a special function register of the microprocessor.

13. The processing system according to claim 10, further comprising a hardware configuration module configured to read a second cryptographic key directly from the non-volatile memory and send the second cryptographic key to the hardware key management circuit, wherein the hardware key management circuit is configured to decrypt the first cryptographic key using the second cryptographic key.

14. The processing system according to claim 13, wherein the cryptographic coprocessor further comprises a third interface configured to receive the second cryptographic key, wherein the hardware key management circuit is configured to store the second cryptographic key in the key storage memory in response to the third interface receiving the second cryptographic key.

15. The processing system according to claim 10, further comprising a further processing unit configured to transmit the source data to the first processing unit or directly to the cryptographic coprocessor.

16. The processing system according to claim 15, wherein the non-volatile memory is not directly accessible by the further processing unit.

17. The processing system of claim 10, wherein the transmission system comprises:

- a transmitter circuit configured to receive data to be transmitted and configuration information from the first processing unit; and
- a receiver circuit configured to receive the data to be transmitted and configuration information from the transmitter circuit that is read by the second processing unit.

18. The processing system of claim 17, wherein the transmission system further comprises:
- a first register configured to receive and store the data to be transmitted and configuration information from the first processing unit and write the data to be transmitted and configuration information to the transmitter circuit; and
- a second register configured to receive and store the data to be transmitted and configuration information from the transmitter circuit and write the data to be transmitted and configuration information to the receiver circuit.

19. The processing system according to claim 10, wherein the processing system is part of an electronic system of a vehicle, the first processing unit, the second processing unit and the cryptographic coprocessor being located within the vehicle.

20. A method of operating a local processing system, the method comprising:
- communicating information from a first processing unit of the local processing system directly to a second processing unit of the local processing system, the first processing unit being a non-secure processing unit and the second processing unit being a secured processing unit, wherein the first processing unit is driven by a first clock signal and the second processing unit is driven by a second clock signal, the second clock signal having a frequency that is less than a frequency of the first clock signal;
- providing source data to a first interface of the local processing system via the first processing unit of the local processing system;
- providing a first cryptographic key to a second interface of the local processing system via the second processing unit of the local processing system;
- processing the source data by selectively encrypting or decrypting the source data using the first cryptographic key to generate processed source data via a hardware cryptography engine, wherein the hardware cryptography engine is driven with the first clock signal; and
- reading the processed source data from the first interface of the local processing system via the first processing unit of the local processing system.

21. The method according to claim 20, further comprising:
- sending the source data to the first interface of the local processing system requesting encryption of the source data;
- reading encrypted source data from the first interface of the local processing system; and
- transmitting the encrypted source data via a communication interface of the local processing system.

22. The method according to claim 20, further comprising:
- receiving encrypted source data via a communication interface of the local processing system;
- sending the encrypted source data to the first interface of the local processing system requesting decryption of the encrypted source data; and reading decrypted source data from the first interface of the local processing system.

\* \* \* \* \*